(12) United States Patent
Kim et al.

(10) Patent No.: US 10,015,621 B2
(45) Date of Patent: Jul. 3, 2018

(54) METHOD OF PROVIDING MTC MONITORING RELATED INFORMATION

(71) Applicant: LG ELECTRONICS INC., Seoul (KR)

(72) Inventors: Laeyoung Kim, Seoul (KR); Jaehyun Kim, Seoul (KR); Taehyeon Kim, Seoul (KR); Hyunsook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 39 days.

(21) Appl. No.: 14/436,764

(22) PCT Filed: Aug. 28, 2013

(86) PCT No.: PCT/KR2013/007694
§ 371 (c)(1),
(2) Date: Apr. 17, 2015

(87) PCT Pub. No.: WO2014/061911
PCT Pub. Date: Apr. 24, 2014

(65) Prior Publication Data
US 2016/0142860 A1    May 19, 2016

Related U.S. Application Data

(60) Provisional application No. 61/715,292, filed on Oct. 18, 2012, provisional application No. 61/819,656, (Continued)

(51) Int. Cl.
*H04W 4/00* (2018.01)
*H04W 60/00* (2009.01)
(Continued)

(52) U.S. Cl.
CPC ............. *H04W 4/005* (2013.01); *H04W 4/70* (2018.02); *H04W 8/02* (2013.01); *H04W 60/00* (2013.01); *H04W 80/02* (2013.01)

(58) Field of Classification Search
CPC ....................................................... H04W 4/00
See application file for complete search history.

(56) References Cited

U.S. PATENT DOCUMENTS

2005/0119008 A1    6/2005  Haumont
2011/0201344 A1*   8/2011  Ryu ........................ H04W 4/08
                                                              455/450
(Continued)

FOREIGN PATENT DOCUMENTS

KR    10-2011-0081750 A    7/2011
KR    10-2012-0011012 A    2/2012
(Continued)

*Primary Examiner* — Mazda Sabouri
(74) *Attorney, Agent, or Firm* — Birch, Stewart, Kolasch & Birch, LLP

(57) ABSTRACT

The present disclosure presents a method of providing information by a subscriber information server for machine type communication (MTC) monitoring. The method may include: receiving information on a monitoring related timer for any MTC device from an MTC related server; adjusting one of the monitoring related timer and a periodic access or location update related timer based on the other timer when there is information on the periodic access or location update related timer for the MTC device; and transmitting information on the adjusted timer to the MTC related server or a monitoring node.

16 Claims, 16 Drawing Sheets

Related U.S. Application Data filed on May 6, 2013, provisional application No. 61/862,090, filed on Aug. 5, 2013.

(51) Int. Cl.
*H04W 8/02* (2009.01)
*H04W 80/02* (2009.01)
*H04W 4/70* (2018.01)

(56) References Cited

U.S. PATENT DOCUMENTS

| | | | | |
|---|---|---|---|---|
| 2012/0039313 A1* | 2/2012 | Jain | ............... | H04B 17/318 |
| | | | | 370/338 |
| 2012/0149383 A1* | 6/2012 | Wang | ............... | H04W 68/02 |
| | | | | 455/450 |
| 2012/0157050 A1* | 6/2012 | Kang | ............... | H04W 12/06 |
| | | | | 455/411 |
| 2012/0166617 A1* | 6/2012 | Chang | ............... | H04W 76/02 |
| | | | | 709/224 |
| 2012/0220326 A1* | 8/2012 | Li | ............... | H04W 4/005 |
| | | | | 455/509 |
| 2012/0264451 A1 | 10/2012 | Kim et al. | | |
| 2012/0270547 A1* | 10/2012 | Long | ............... | H04W 60/02 |
| | | | | 455/435.1 |
| 2012/0282956 A1* | 11/2012 | Kim | ............... | H04L 12/5895 |
| | | | | 455/466 |
| 2013/0051228 A1 | 2/2013 | Kim et al. | | |
| 2013/0244695 A1 | 9/2013 | Park et al. | | |
| 2013/0279458 A1* | 10/2013 | Farkas | ............... | H04L 29/12273 |
| | | | | 370/329 |
| 2014/0003234 A1* | 1/2014 | Chou | ............... | H04W 4/005 |
| | | | | 370/230 |

FOREIGN PATENT DOCUMENTS

WO  WO 2012/074317 A2  6/2012
WO  WO 2012/138171 A2  10/2012

\* cited by examiner

METHOD OF PROVIDING MTC MONITORING RELATED INFORMATION

CROSS REFERENCE TO RELATED APPLICATIONS

This application is the National Phase of PCT/KR2013/007694 filed on Aug. 28, 2013, which claims priority under 35 U.S.C. 119(e) to U.S. Provisional Application Nos. 61/715,292 filed on Oct. 18, 2012; 61/819,656 filed on May 6, 2013; and 61/862,090 filed on Aug. 5, 2013, all of which are hereby expressly incorporated by reference into the present application.

BACKGROUND OF THE INVENTION

Field of the Invention

The present invention relates to a Machine Type Communication (MTC) monitoring method.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3 GPP anchor functions of a GPRS core and the S-GW. Furthermore, if a direct tunnel is not established, the reference point provides user plane tunneling. |

TABLE 1-continued

| REFERENCE POINT | DESCRIPTION |
|---|---|
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5 is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 6 illustrates a connection process in a radio resource control (RRC) layer.

FIG. 6 shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

FIG. 7 shows a 3GPP service model for supporting MTC.

A Machine Type Communication (MTC) device may be used in a mobile communication system. MTC implies communication between one machine and another machine or between a machine and a server, excluding a human intervention. A device used in this case is called the MTC device, and a server used in this case is called an MTC server. A service provided through the MTC device is distinguished from a communication service based on the human intervention, and may be applied to various ranges of services.

The aforementioned MTC device is a communication device for performing communication between one machine and another machine or between a machine and a server, and is not much different from a User Equipment (UE) with a human intervention, except that the human intervention is excluded. That is, the MTC device may correspond to the UE excluding the human intervention. However, in terms of excluding the human intervention, some problems may occur if a message transmission/reception method (e.g., a paging message transmission/reception method) of the UE with the human intervention is uniformly applied to the MTC device.

To support the MTC, although it is defined that communication is achieved through a PS network in GSM/UMTS/EPS of the 3GPP standard, a method also applicable to a CS network is described in the present specification.

A UE used for the MTC (or an MTC UE) and an end-to-end application between MTC applications may use services provided by a 3GPP system and selective services provided by the MTC server. The 3GPP system may include transmission and communication services (including a 3GPP bearer service, an IMS, and an SMS) including various optimizations for facilitating the MTC. It is shown in FIG. 7 that the UE used for the MTC is connected to a 3GPP network (e.g., UTRAN, E-UTRAN, GERAN, I-WLAN, etc.) through an Um/Uu/LTE-Uu interface. The architecture of FIG. 7 includes various MTC models (e.g., a direct model, an indirect model, and a hybrid model).

Entities shown in FIG. 7 are now described.

In FIG. 7, an application server is a server on a network on which an MTC application is executed. The aforementioned various techniques for implementing the MTC applications may be applied to the MTC application server, and a detailed description thereof will be omitted. In addition, in FIG. 7, the MTC application server may access the MTC server through a reference point API, and a detailed description thereof will be omitted. Alternatively, the MTC application server may be collocated with the MTC server.

The MTC server (e.g., a Services Capability Server (SCS) shown in the figure) is a server on a network for managing an MTC UE, and may be connected to a 3GPP network to communicate with a UE used for MTC and nodes of PLMN.

An MTC-InterWorking Function (MTC-IWF) may control interworking between an MTC server and an operator core network, and may play a role of a proxy of an MTC operation. To support the MTC indirect or hybrid model, one or more MTC-IWFs may exist in a Home PLMN (HPLMN). The MTC-IWF may relay or interpret a signaling protocol on a reference point Tsp to operate a specific function in the PLMN. The MTC-IWF may perform a function for authenticating an MTC server before the MTC server establishes communication with a 3GPP network, a function for authenticating a control plane request from the MTC server, various functions related to a trigger indication, etc.

An SMS-SC (Short Message Service-Service Center)/IP-SM-GW (Internet Protocol Short Message GateWay) may manage transmission/reception of a Short Message Service (SMS). The SMS-SC may relay a short message between a Short Message Entity (SME) (i.e., an entity for transmitting or receiving a short message) and a mobile station and may serve for a storing-and-delivering function. The IP-SM-GW may serve for a protocol interaction between an IP-based UE and the SMS-SC.

A CDF (Charging Data Function)/CGF (Charging Gateway Function) may perform an accounting related operation.

An HLR/HSS may perform a function for storing subscriber information (e.g., IMSI, etc.), routing information, configuration information, etc., and for providing it to the MTC-IWF.

An MSC/SGSN/MME may perform a control function such as mobility management, authentication, resource allocation, etc., for network connection of the UE. Regarding triggering, a function for receiving a trigger indication from the MTC-IWF and for processing it in a form of a message provided to the MTC UE may be performed.

A GGSN (Gateway GPRS Support Node)/S-GW (Serving-Gateway)+P-GW (Packet Data Network-Gateway) may perform a function of a gateway which serves for connection of a core network and an external network.

Table 2 below is a summary of an important reference point in FIG. 7.

TABLE 2

| Reference point | Description |
|---|---|
| Tsms | It is the reference point used by an entity outside the 3GPP system to communicate with UEs used for MTC through an SMS. |
| Tsp | It is the reference point used by an entity outside the 3GPP system to communicate with the MTC-IWF related control plane signalling. |
| T4 | Reference point used by the MTC-IWF to route device trigger to the SMS-SC in the HPLMN. |
| T5a | Reference point used between the MTC-IWF and the serving SGSN. |
| T5b | Reference point used between the MTC-IWF and the serving MME. |
| T5c | Reference point used between the MTC-IWF and the serving MSC. |
| S6m | Reference point used by the MTC-IWF to interrrogate the HSS/HLR for E.164 MSISDN (Mobile Station International Subscriber Directory Number) or external identifier mapping to IMSI and gather UE reachability and configuration information. |

At least one of the reference points T5a, T5b, and T5c is referred to as T5.

Meanwhile, user plane communication with the MTC server in case of the indirect and hybrid model and communication with the MTC application in case of the direct and hybrid model may be performed by using the existing protocol through reference points Gi and SGi.

The 3GPP TS 23.682 document may be incorporated by reference for details of the description of FIG. 7.

FIG. 8 shows an example of a service via an MTC device.

The service via the MTC device may be classified into several types. For example, there is a service for collecting a variety of information by the MTC device.

Referring to FIG. 8, as an example of the aforementioned service, it is shown that a measuring service, a road information service, a user electronic device control service, etc., can be provided via the MTC device. Herein, when the MTC device collects measuring information, road traffic information, etc., and transmits it to an eNodeB, the eNodeB may transmit it to an MTC server, and an MTC user may use a provided service.

A 3GPP service model/system for supporting MTC may provide a monitoring function/service for managing the MTC device. For example, a 3GPP system may detect the following event and report the detected event to the MTC server, so that the MTC user is allowed to easily manage the MTC device.

The MTC device performs an operation not suitable for an activated MTC feature(s).

Change in an association between the MTC device and a UICC.

The MTC device has lost a connectivity to a network. A maximum time between a time at which the connectivity is actually lost and a time at which the connectivity loss is detected is configurable in unit of subscribers.

Communication failure event and its cause.

Location change (a geographical position and/or a point of attachment in the network of the MTC device)

Although the MTC device can be monitored as described above, a detailed procedure and solution thereof have not been provided. Therefore, conventionally, the aforementioned services are only imperfect or infeasible techniques in practice.

SUMMARY OF THE INVENTION

Accordingly, an aspect of the present specification is to provide a method of solving the above-mentioned problems.

To achieve the aforementioned purpose, the present specification is to provide a method of providing information for MTC (Machine type communication) monitoring. The method may performed by a subscriber information server and comprise: receiving information regarding a monitoring related timer for any MTC device from an MTC related server; if there is information regarding a periodic access or location update related timer for the MTC device, adjusting any one of the monitoring related timer and the periodic access or location update related timer on the basis of the other one; and delivering information regarding the adjusted timer to the MTC related server or a node served for monitoring.

To achieve the aforementioned purpose, the present specification is to provide a method of providing information for MTC (Machine type communication) monitoring. The method may be performed by a network node and comprise: receiving information regarding a monitoring related timer for any MTC device from an MTC related server; acquiring information regarding a periodic access or location update related timer for the MTC device; adjusting any one of the monitoring related timer and the periodic access or location update related timer on the basis of the other one; performing monitoring on the basis of information regarding the adjusted timer; and providing the information regarding the adjusted timer to the MTC device.

The periodic access or location update related timer has one or more of: a timer value for a periodic RAU (Routing Area Update); a timer value for an RAU with a longer period; a timer value for a periodic TAU (Tracking Area Update); and a timer value for a TAU with a longer period.

The periodic access or location update related timer has one or more of: a T3312 value for an RAU; a T3312 extended value; a T3412 value for a TAU; and a T3412 extended value.

The monitoring related timer has one or more of: a time value capable of determining that a monitoring event is detected; and a period value for detecting whether the monitoring event is generated.

The adjusting additionally considers one or more of: subscriber information; capability information or priority information of the MTC device; operator policy information; MTC monitoring related information; information acquired from another node; network status information; information associated with a mobility management related operation; and information association with a session management related operation.

In the adjusting, the periodic access or location update relater timer is adjusted on the basis of the monitoring related timer, or the monitoring related timer is adjusted on the basis of the periodic access or location update related timer.

The MTC related server is an MTC-IWF (Machine Type Communications-InterWorking Function), a service capability server, or an application server. The node served for monitoring is an MME (Mobility Management Entity) or an SGSN (Serving GPRS Support Node)

According to an aspect of the present specification, there is provided an effective Machine Type Communication (MTC) monitoring method. That is, according to an aspect of the present specification, it is possible to perform MTC related monitoring for confirming whether an access to a core network by an MTC device is normally achieved or whether a connection to a network is valid with a specific period. It is also possible to perform MTC related monitoring for confirming an access location for the MTC device or a change in the access location with a specific period.

DESCRIPTION OF EXEMPLARY EMBODIMENTS

Figure 1:
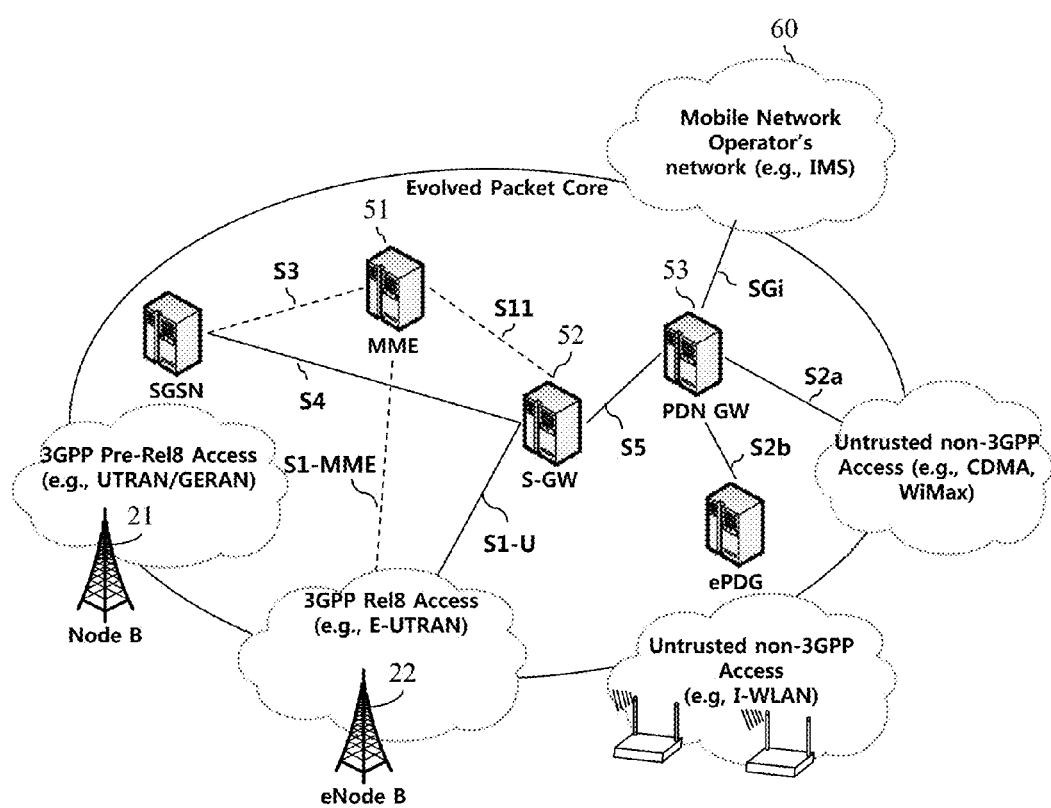
FIG. 1 shows the configuration of an evolved mobile communication network.
Figure 2:
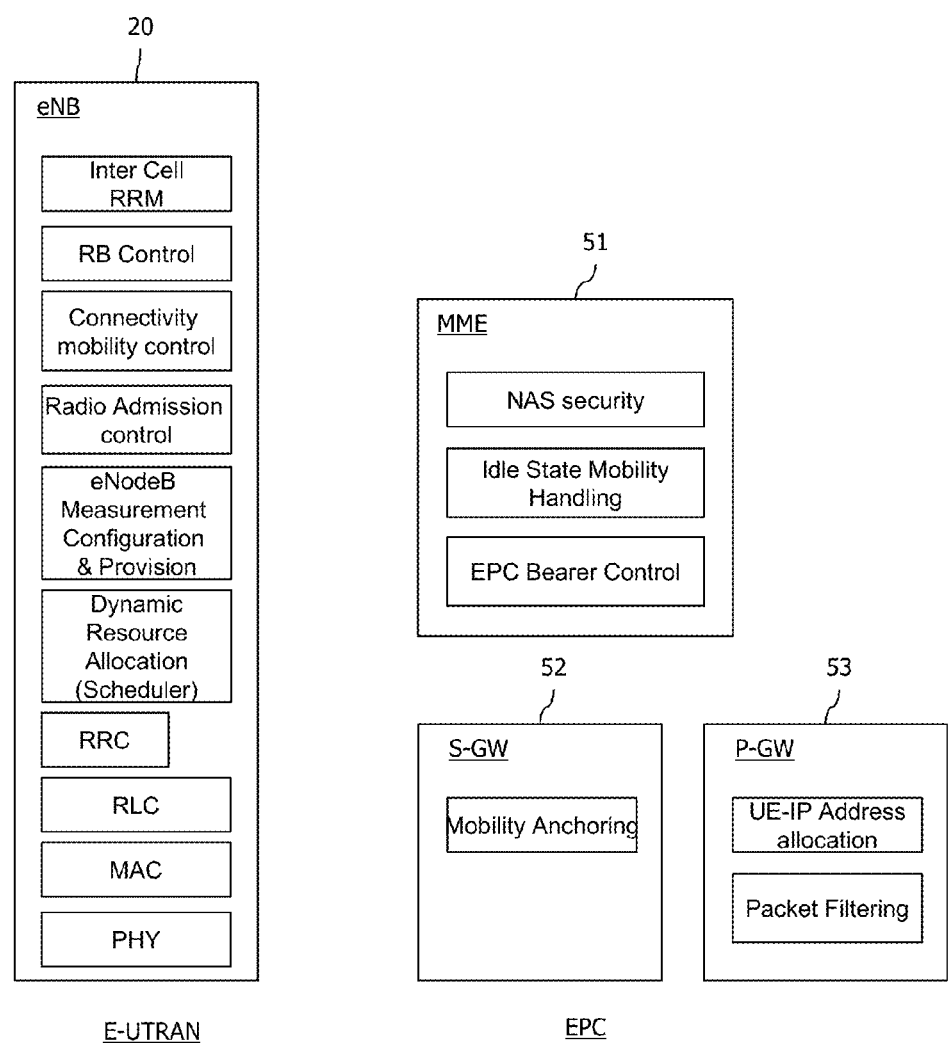
FIG. 2 is an exemplary diagram showing the architecture of a common Evolved Universal Terrestrial Radio Access Network (E-UTRAN) and a common Evolved PAcket Core (EPC).
Figure 3:
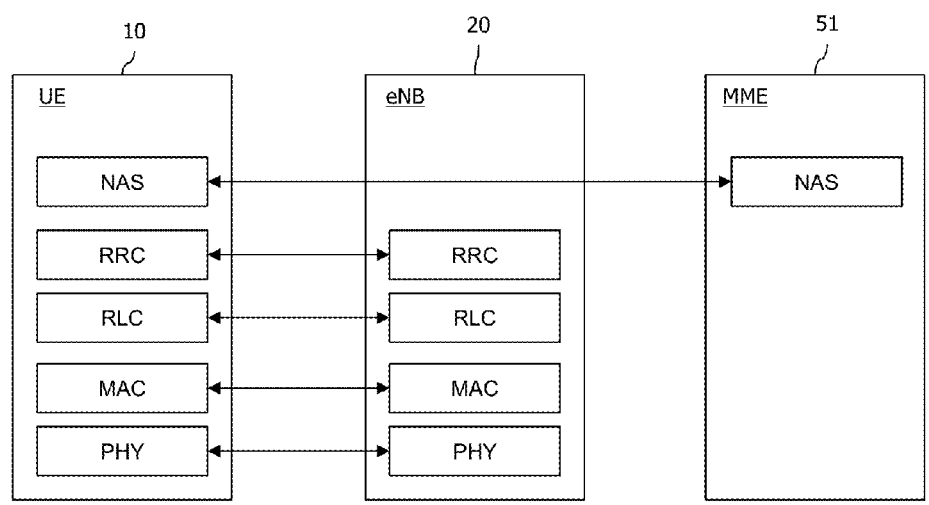
FIG. 3 is an exemplary diagram showing the structure of a radio interface protocol in a control plane between a User Equipment (UE) and an evolved NodeB (eNodeB).
Figure 4:
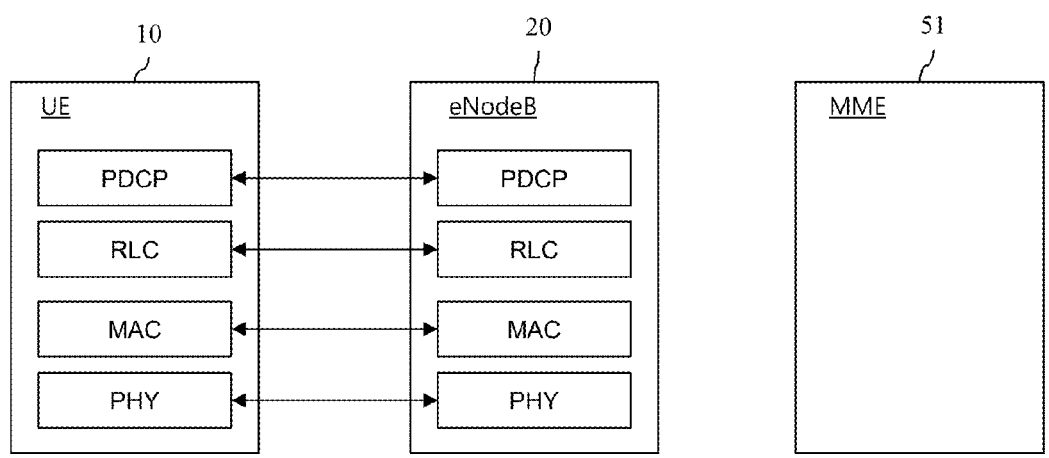
FIG. 4 is another exemplary diagram showing the structure of a radio interface protocol in a control plane between a UE and an eNodeB.
Figure 5:
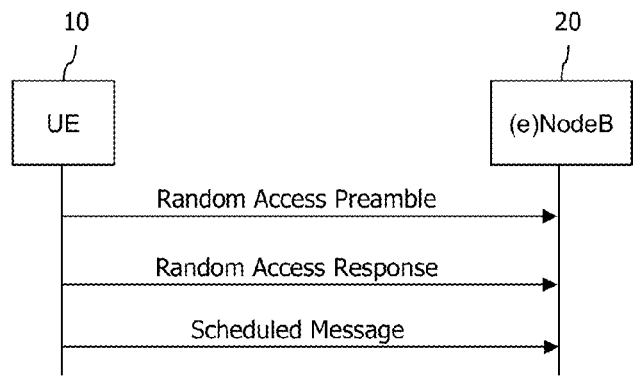
FIG. 5 is a flowchart illustrating a random access process in 3rd Generation Partnership Project (3GPP) Long Term Evolution (LTE).
Figure 6:
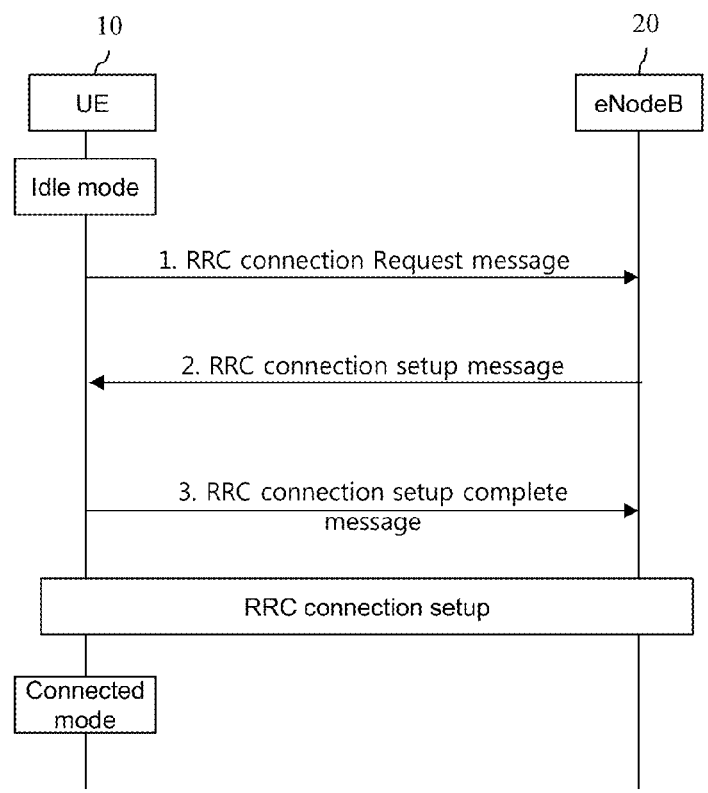
FIG. 6 shows a connection process in a Radio Resource Control (RRC) layer.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

UMTS: stands for Universal Mobile Telecommunication System and means a 3rd generation mobile communication network.

UE/MS: User Equipment/Mobile Station. Means a terminal device.

EPC: stands for Evolved Packet Core and means a core network supportive of a long term evolution (LTE) network. An evolved version of UMTS EPS: stands for Evolved Packet System and means a mobile communication system including a UE, an access network including LTE, and an EPC.

PDN (Public Data Network): an independent network in which a service providing server is located PDN connection: connection from UE to PDN, i.e., association (connection) between a UE represented with an IP address and a PDN represented with an APN (access point name)

PDN-GW (Packet Data Network Gateway): a network node of an EPS network performing functions such as UE IP address allocation, packet screening & filtering, and charging data collection Serving GW (Serving Gateway): a network node of an EPS network performing functions such as mobility anchor, packet routing, idle mode packet buffering, and triggering MME to page UE PCRF (Policy and Charging Rule Function): an EPS network node performing policy decision for dynamically applying QoSs and billing policies differentiated per service flow APN (Access Point Name): name of an access point managed by a network, provided from a UE, i.e., a character string for denoting a PDN or distinguishing a PDN from another. Accessing a requested service or network (PDN) gets through a corresponding P-GW, and an APN is a name (e.g., internet.mnc012.mcc345.gprs) pre-defined in the network to be able to discover the P-GW.

TEID (Tunnel Endpoint Identifier): End point ID of a tunnel configured between nodes in a network. A TEID is configured per section by the bearer of each UE.

NodeB: a UMTS network base station. A NodeB is installed outdoors and corresponds in cell coverage size to a macro cell.

eNodeB: an EPS (Evolved Packet System) base station and is installed outdoors. An eNodeB corresponds in cell coverage size to a macro cell.

(e)NodeB: collectively denotes NodeB and eNodeB

MME: stands for Mobility Management Entity and plays a role to control each entity in an EPS to provide mobility and session for a UE.

Session: a pathway for data transmission. The unit of session may include PDN, bearer, and IP flow which respectively correspond the unit of the overall target network (unit of APN or PDN), the unit distinguished by QoS therein (unit of bearer), and unit of destination IP address.

PDN connection: a connection from a UE to a PDN, i.e., an association (connection) between a UE represented with an IP address and a PDN represented with an APN. This means a connection (UE-PDN GW) between entities in a core network to form a session.

UE Context: information on UE's context used to manage UE in network, i.e., context information consisting of UE id, mobility (e.g., current location), and session attribute (QoS, or priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameters associated with NAS functionality MTC: Machine Type Communication which is communication achieved between devices or between a device and a server without a human intervention.

MTC device: A UE which serves for a specific purpose having a communication function through a core network, for example, a vending machine, a meter reading device, a weather sensor, etc. The MTC device may be also referred to as an MTC terminal, an MTC apparatus, an MTC machine, an MTC UE, a UE user for MTC, a UE configured for MTC, etc.

MTC server: A server which manages the MTC device and exchanges data on a network. The server may exist outside the core network.

MTC application: An actual application using the MTC device and the MTC server (e.g., remote meter reading, product delivery tacking, etc.).

MTC feature: A function or feature of a network for supporting the application. That is, some features are required according to a usage of each application. Examples thereof include MTC monitoring (required for remote meter reading or the like for a lost device), a low mobility (almost no movement in case of the vending machine), small data transmission (only small amount of data is transmitted/received by the MTC device), etc.

MTC user: A user who uses a service provided by the MTC server.

NAS (Non-Access-Stratum): A higher stratum of a control plane between a UE and an MME. The NAS supports mobility management, session management, IP address management, etc., between the UE and the network.

MM (Mobility Management) operation/procedure: An operation or procedure for mobility regulation/management/control of the UE. The MM operation/procedure may be interpreted as including one or more of an MM operation/procedure in a CS network, a GMM operation/procedure in a GPRS network, and an EMM operation/procedure in an EPS network. The UE and the network node (e.g., MME, SGSN, and MSC) exchange an MM message to perform the MM operation/procedure.

SM (Session Management) operation/procedure: An operation or procedure for regulating/managing/processing/ handling a user plane and/or a bearer context/PDP context of the UE. The SM operation/procedure may be interpreted as including one or more of an SM operation/procedure in a GPRS network and an ESM operation/procedure in an EPS network. The UE and the network node (e.g., MME and SGSN) exchange an SM message to perform the SM operation/procedure.

Low priority UE: A UE configured for NAS signalling low priority. The standard document 3GPP TS 24.301 and TS 24.008 may be incorporated by reference for details thereof.

Dual priority UE: A UE configured for dual priority. That is, a UE which provides dual priority support is configured for a NAS signalling low priority and also configured to override the NAS signalling low priority indicator. The standard document 3GPP TS 24.301 and TS 24.008 may be incorporated by reference for details thereof.

Hereinafter, an aspect of the present specification is described with reference to the accompanying drawings.

Figure 9:
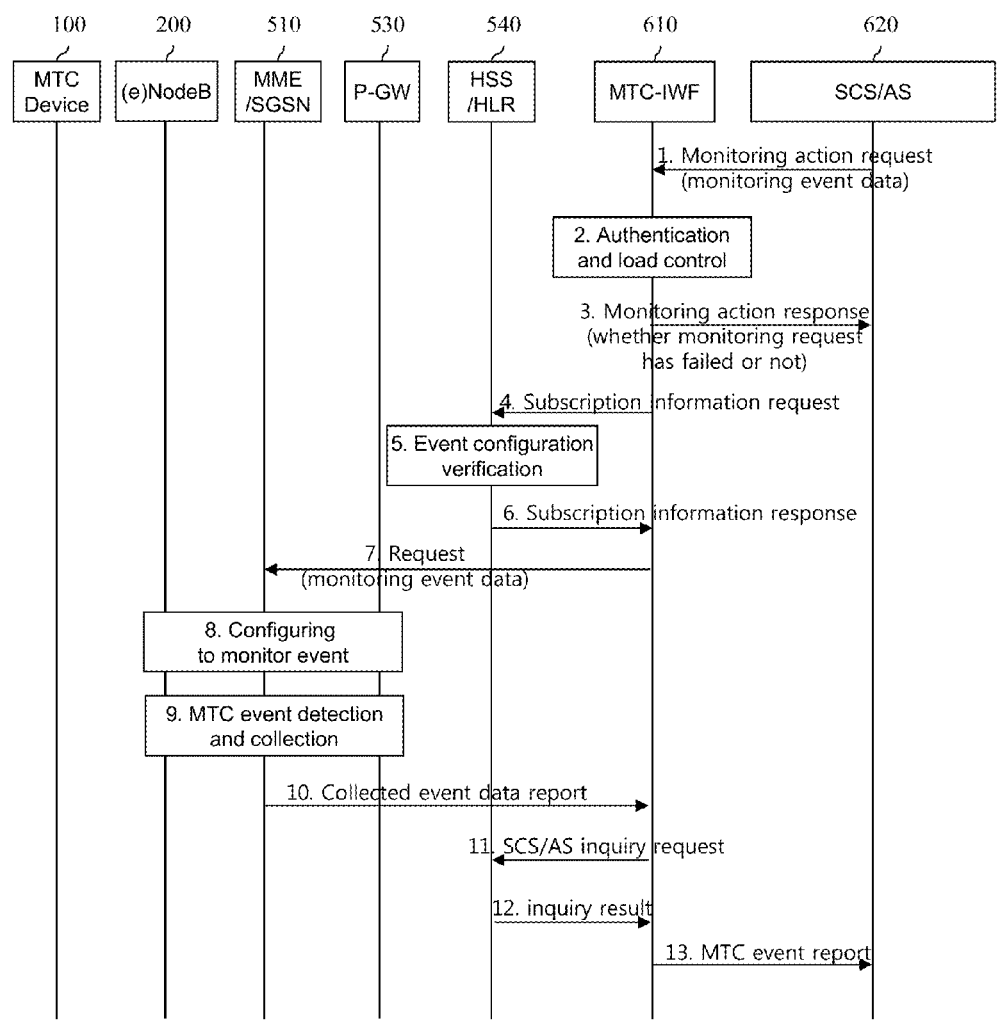
FIG. 9 is a signal flow diagram showing a process of performing MTC-related monitoring by a network node.

FIG. 9 is a signal flow diagram showing a process of performing MTC-related monitoring by a network node.

Referring to FIG. 9, the MTC-related monitoring may be requested to be performed by the network node. As such, the network node performs the monitoring because it is more effective than monitoring performed by the MTC device, for example, when an event occurs in which an MTC device installed in things is detached. The MTC monitoring includes activating monitoring of a specific event, detecting the event, and reporting the detected event to a verified user, e.g., an application. Upon detection of the event, the network node may instruct a special operation such as a specific behavior, e.g., an access restriction, an allocated resource reduction, etc.

Figure 7:
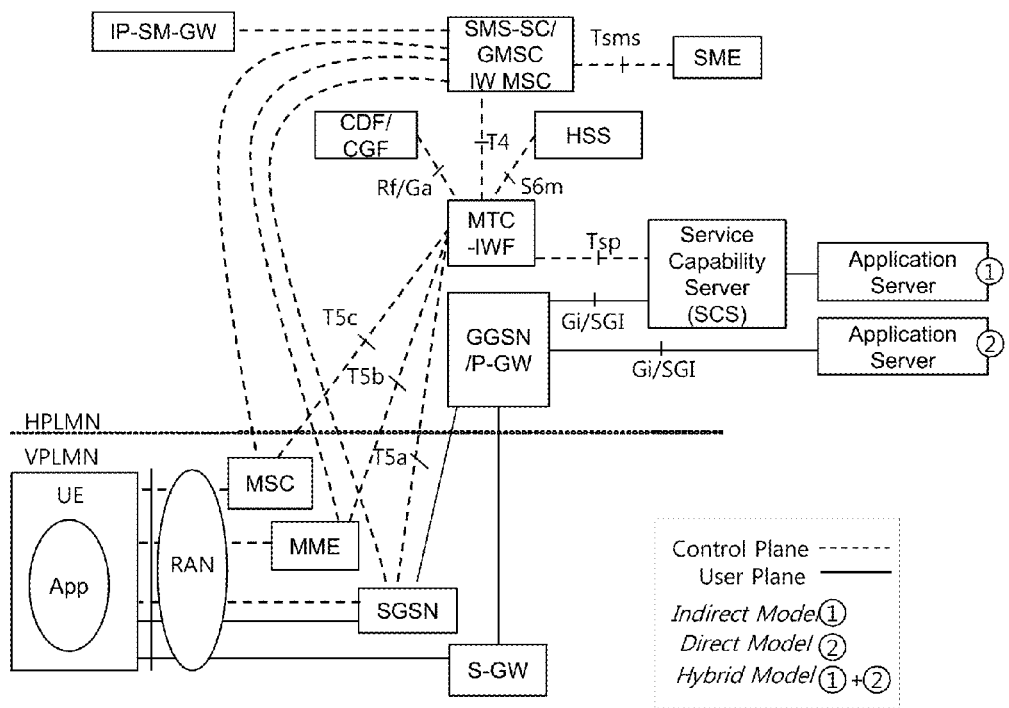
FIG. 7 shows a 3GPP service model for supporting Machine Type Communication (MTC).
Figure 8:
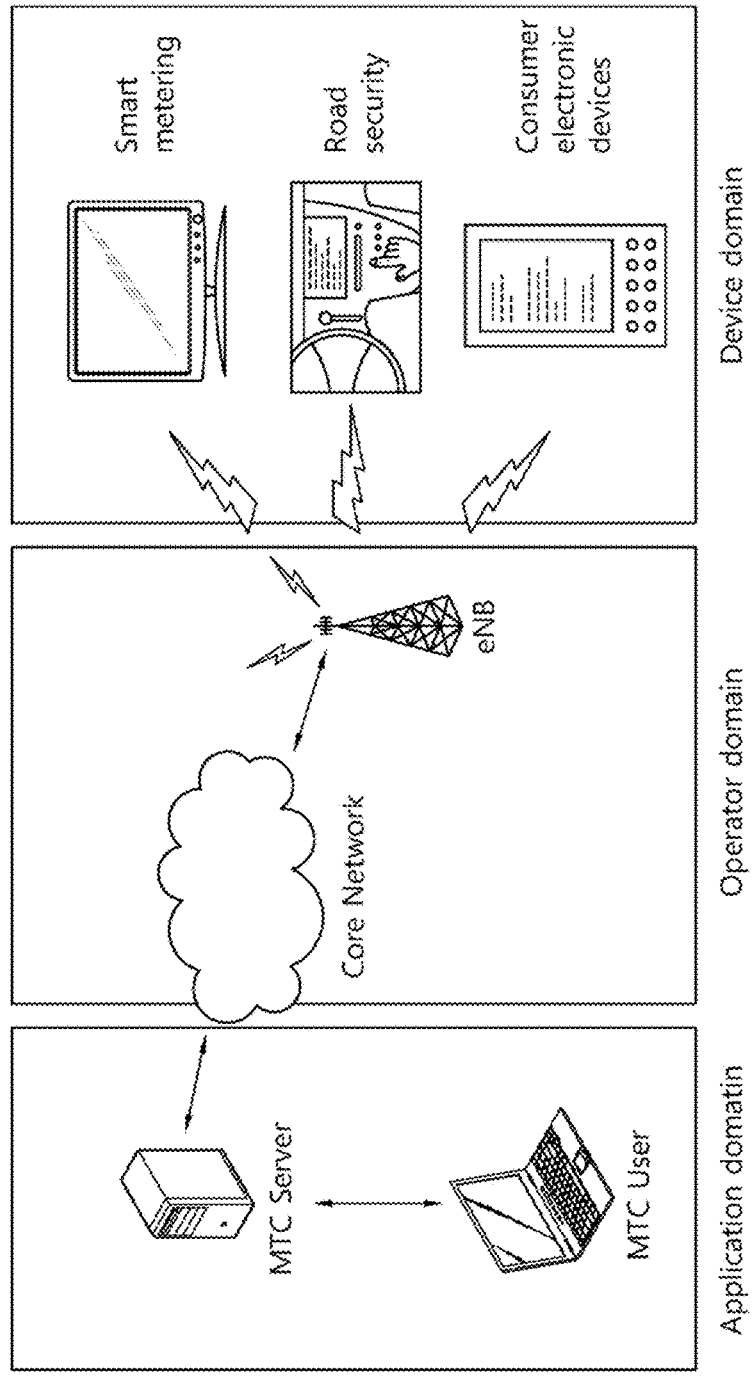
FIG. 8 shows an example of a service via an MTC device.

1) More specifically, referring to FIG. 9, a Services Capability Server (SCS)/Application Server (AS) 620 transmits a monitoring action request message to an MTC-IWF 610. The monitoring action request may include event-related data to be monitored (also called monitoring event data). The monitoring event data may include an action type field for configuring, activating, deactivating, or triggering a report delivery regarding a specific monitoring event. In addition, the monitoring event data may further include a monitoring event ID and related parameter, a monitoring event priority, a monitoring destination node, etc. Herein, the MTC-IWF 610 as a device for performing an MTC interworking function is connected to the MMC/Serving GPRS Support Node (SGSN) 510 through a T5b interface as shown in FIG. 7, and is connected to the SCS/AS 620 through a Tsp interface.

2~3) Upon reception of the request, the MTC-IWF 610 authenticates whether the SCS/AS 620 has a right for the request, and confirms whether the request of the SCS/AS 620 is beyond a predetermined allocation criterion. If the confirmation result shows that the request of the SCS/AS 620 is not acceptable, the MTC-IWF 610 transmits to the SCS/AS 620 a monitoring action response including a cause value indicating a failure cause of the request. Otherwise, if the confirmation result shows that the request of the SCS/AS 620 is acceptable, the MTC-IWF 610 transmits to the SCS/AS 620 a monitoring action response including a value indicating a success of the request.

4) Subsequently, the MTC-IWF 610 transmits a subscriber information request message to a Home Subscription Server (HSS) 540 to confirm a monitoring configuration detail, e.g., a monitoring event ID. Herein, the monitoring event may be stored in the HSS/HLR 540 as the subscriber information.

5) The HSS/HLR 540 verifies the monitoring event information, and authenticates whether an MTC-IWF which attempts to configure a network node for the monitoring is acceptable. In addition, the HSS/HLR 540 delivers to the MTC-IWF 10 the subscriber information including the monitoring event related information.

6-7) The MTC-IWF 610 determines the network node for performing the monitoring, on the basis of information received from the SCS/AS 620 and the HSS/HLR 540. If the network node for performing the monitoring is determined as the MME/SGSN 510, the MTC-IWF 610 transmits to the MME/SGSN 510 a request including monitoring event data.

8) Upon reception of the request including the monitoring event data, the MME/SGSN 510 is configured to monitor the event.

Meanwhile, although the configured event may be monitored by the MME/SGSN 510, it may also be monitored by the (e)NodeB 200 and/or the P-GW 530 according to a situation.

9~10) If the event is detected and collected through monitoring performed by the MME/SGSN 510, a report for the collected event data may be transmitted to the MTC-IWF 610.

11~13) The MTC-IWF 610 confirms whether a user who will receive the report is recorded in the subscription information.

If the information is not included in the report received from the MME/SGSN 510, an inquiry request of the SCS/AS 620 or the application server is transmitted to the HSS/HLR 540. Upon reception of an inquiry result from the HSS/HLR 540, a report for an MTC event is transmitted to the SCS/AS 620 or application server which has confirmed the inquiry.

The method of performing the MTC-related monitoring by the network node has been described above.

Hereinafter, a procedure in which an MTC device 100 accesses a core network is described, and a problem which may occur in the monitoring procedure of FIG. 9 will be described.

Figure 10:
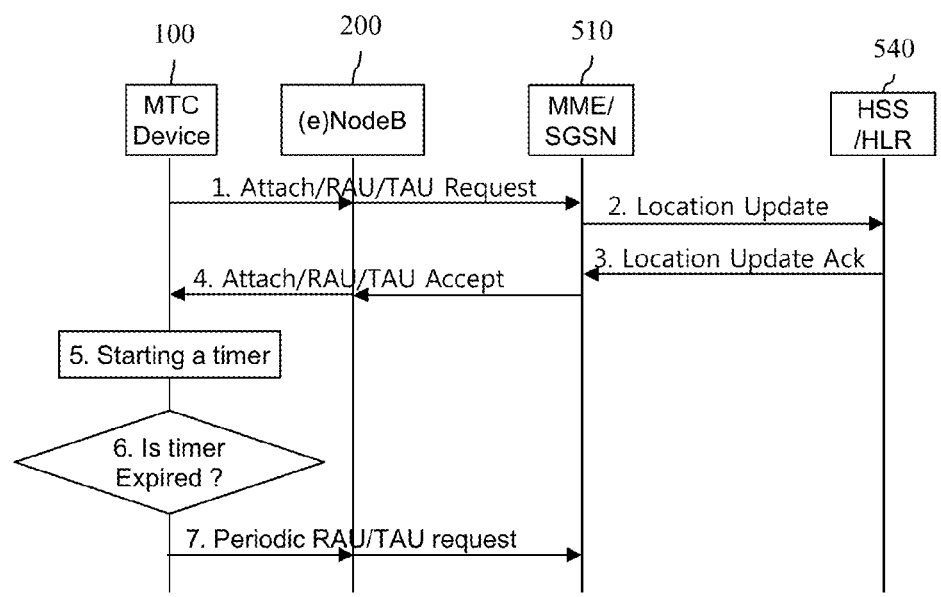
FIG. 10 shows a procedure in which an MTC device accesses a core network.

FIG. 10 shows a procedure in which an MTC device accesses a core network.

Referring to FIG. 10, an attach procedure, an RAU (Routing Area Update) procedure, and a TAU (Tracking Area Update) procedure are collectively illustrated. However, it should be understood such that the attach procedure and the RAU procedure are performed when the MTC device camps on a GERAN or a UTRAN, and the attach procedure and the TAU procedure are performed when the MTC device camps on an E-UTRAN.

The MTC device 100 transmits an attach request/RAU (Routing Area Update) request/TAU (Tracking Area Update) request message to an MME/SGSN 510 via an (e)NodeB 200. Then, the MME/SGSN 510 transmits a location update request to an HSS/HLR 540. The HSS/HLR transmits a location update acknowledgement message to the MME/SGSN 510. Then, the MME/SGSN 510 transmits an attach/RAU/TAU accept message to the MTC device 100.

In this case, the attach accept message may include information as shown in Table 3 or Table 4 below. Table 3 shows an attach accept message for a case where the MTC device camps on the E-UTRAN and performs an attach request to a core network, and Table 4 shows an attach accept message for a case where the MTC device camps on the GERAN/UTRAN and performs the attach request to the core network.

TABLE 3

| Information | Description |
| --- | --- |
| Attach accept message identity | Message identity |
| Attach result | Indicate an attach result, for example, a success or a failure |
| T3412 value | Timer value for periodic TAU |
| T3402 value | Timer starting at an attach failure |
| T3412 extended value | Value extended from T3412 value to be longer than periodic TAU |

TABLE 4

| Information | Description |
| --- | --- |
| Attach accept message identity | Message identity |
| Attach result | Indicate an attach result, for example, a success or a failure |
| Periodic RA update timer value (T3312 value) | Timer value for periodic RAU |
| T3302 value | Timer starting at an attach failure |
| T3312 extended value | Value extended from T3312value to be longer than periodic RAU |

Further, the TAU accept message may include information as shown in Table 5 below.

TABLE 5

| Information | Description |
| --- | --- |
| TAU accept message identity | Message identity |
| TAU result | Indicate an update result, for example, a success or a failure |
| T3412 value | Timer value for periodic TAU |
| T3402 value | Timer starting at a TAU failure |
| T3412 extended value | Value extended from T3412 value to be longer than periodic TAU |

Further, the RAU accept message may include information as shown in Table 6 below.

TABLE 6

| Information | Description |
| --- | --- |
| RAU accept message identity | Message identity |
| RAU result | Indicate an update result, for example, a success or a failure |
| Periodic RA update timer value (T3312 value) | Timer value for periodic RAU |
| T3302 value | Timer starting at an RAU failure |
| T3312 extended value | Value extended from T3312 value to be longer than periodic RAU |

In Table 3 and Table 5 above, the T3412 value is a value for allowing the MTC device 100 to perform periodic TAU. However, in order to reduce a network load caused by the periodic TAU, the T3412 extended value exists so that the TAU can be performed with a longer period. The T3412 extended value may be configured in the MME 510, or may be stored in the HSS 540 as subscriber information. The MME 510 may select any one of the T3412 value and the T3412 extended value and may apply the selected value to the MTC device 100.

In Table 4 and Table 6 above, the T3312 value is a value for allowing the MTC device 100 to perform periodic RAU. However, in order to reduce a network load caused by the periodic RAU, the T3312 extended value exists so that the RAU can be performed with a longer period. The T3312 extended value may be configured in the SGSN 510, or may be stored in the HSS 540 as subscriber information. The SGSN 510 may select any one of the T3312 value and the T3312 extended value and may apply the selected value to the MTC device 100.

Meanwhile, when the MTC device 100 receives the accept message, several pieces of timer information included in the accept message are confirmed. Further, the MTC device 100 starts a required timer among several timers included in the accept message, for example, a periodic access (or location update) related timer. For example, the MTC device 100 runs a timer according to a value of the T3312 timer for a periodic RAU procedure. Alternatively, the MTC device 100 runs the timer according to a value of the T3412 timer for a periodic TAU procedure. Alternatively, the MTC device 100 runs the timer according to a value of the 13412 extended timer for a TAU procedure with a longer period. Alternatively; the MTC device 100 runs the timer according to a value of the T3312 extended timer for an RAU procedure with a longer period. The timer managed by the MTC device 100 may be as shown in Table 7 or Table 8 below.

Table 7 below shows a GPRS mobility management timer related to the attach procedure and the RAU procedure.

TABLE 7

| TIMER NUM | TIMER VALUE | CAUSE OF START | NORMAL STOP | ON EXPIRY |
| --- | --- | --- | --- | --- |
| T3302 | Default 12 min | When the attach fails and the attempt count is greater than or equal to 5 When the RAU fails and the attempt counter is greater than or equal to 5 | When the attach procedure is initiated When the RAU procedure is initiated | At expiry, the attach procedure or the RAU procedure is initiated |
| T3312 | Default 54 min | In A/Gb mode, when the READY state is released, In Iu mode, when the PMM-CONNECTED mode is released. | In A/Gb mode, when entering the READY state In Iu mode, when entering the PMM-CONNECTED mode | Periodic RAU procedure is initiated if the attach is not for emergency bearer services. |

Table 8 below shows an EPS mobility management timer related to an attach procedure and a TAU procedure.

TABLE 8

| TIMER NUM | TIMER VALUE | CAUSE OF START | NORMAL STOP | ON EXPIRY |
|---|---|---|---|---|
| T3402 | Default 12 min | When the attach or TAU fails and the attempt count is greater than or equal to 5 | When the attach or TAU request message is transmitted | The attach or TAU procedure is initiated |
| T3410 | 15 s | The attach request message is transmitted | When the attach accept or reject message is received | Start T3411 or T3402 |
| T3411 | 10 s | When the attach fails due to failure in lower layer or T3410 timeout, or when the attach is rejected When the TAU fails due to failure in low layer or T3430 timeout, or when the TAU is rejected | When the attach request message or TAU request message is transmitted | The attach request or TAU request message is retransmitted |
| T3412 | Default 54 min. | In the EMM-REGISTERED state, when the EMM-CONNECTED mode is released | When entering state the EMM-DEREGISTERED state or when entering the EMM-CONNECTED mode | The periodic TAU procedure is initiated if the attach is not for emergency bearer services It is implicitly detached from the network if the attach is for emergency bearer services |

The MTC device 100 monitors an expiry of a periodic access (or location update) relater timer, for example, a T3312 timer or a T3312 extended timer or a T3412 timer or a T3412 extended timer.

At the expiry of the periodic access (or location update) related timer (e.g., the T3312 timer, the T3312 extended timer, the T3412 timer, or the T3412 extended timer), the MTC device 100 may transmit a periodic RAU request message or a periodic TAU request message to the MME/SGSN 510 via the (e)NodeB 200. The periodic access (or location update) related timer and an operation of a UE related to the timer may be found in the standard document 3GPP TS 23.401, TS 23.060, TS 24.301, TS 24.008.

Meanwhile, the MTC device 100 may perform the TAU/RAU procedure, so that the network node can perform MTC related monitoring as shown in FIG. 9 in regards to a core network access (or a location update). However, one problem may occur in this case. For example, regarding that the MTC device 100 performs the TAU/RAU procedure to access a core network (or to update a location), as shown in FIG. 9, the network node may perform MTC related monitoring by confirming whether an access to the core network (or location update) is normally achieved by the MTC device 100 with a specific period. By reference, an example of the monitoring may include a location change of the MTC device or a loss of a connectivity to the network. However, the following problem may occur in the MTC related monitoring method. For example, a problem may occur when the periodic access (or location update) related timer (e.g., a T3312 timer, a T3312 extended timer, a T3412 timer, or a T3412 extended timer) and the MTC related monitoring do not have the same period. More specifically, if the network node performs monitoring when a period of the MTC related monitoring is arrived at a time at which the MTC device 100 does not perform the TAU/RAU procedure since the periodic access (or location update) related timer has not been expired yet, the network node may erroneously determine that the MTC device 100 does not have a normal access to the network.

Accordingly, a method of solving the aforementioned problem is described hereinafter. The MTC monitoring method proposed in the present invention may be implemented by combining one or more methods described below.

In a first method, a network node may configure/adjust a value of a periodic access (or location update) related timer (e.g., a timer for periodic TAU/RAU) (e.g., a T3312 timer, a T3312 extended timer, a T3412 timer, or a T3412 extended timer) (e.g., a subscribed periodic RAU/TAU timer) by considering a time value (i.e., D_max) capable of determining that a monitoring event is detected (e.g., a time value for detecting an event regarding a change of a network point to which the MTC device 100 has an access, or a time value capable of determining that a network access of the MTC device 100 is disconnected, etc.) and/or a period (i.e., D_period) for detecting whether a specific monitoring event occurs (e.g., a period for detecting whether there is a change in a network point to which the MTC device 100 has an access or a period capable of determining that a network access of the MTC device 100 is disconnected). On the contrary, the network node may configure/adjust a time value (i.e., D_max) capable of determining that a monitoring event is detected and/or a period (i.e., D_period) for detecting whether a specific monitoring event occurs, by considering a periodic access (or location update) related timer (e.g., a timer for periodic TAU/RAU).

In a second method, if the network node performs monitoring regarding that the MTC device 100 performs a network access (or location update) to a core network through a TAU/RAU procedure, the network node which performs the monitoring may configure/change/manage a value of a periodic access (or location update) related timer (e.g., a timer for periodic TAU/RAU).

Hereinafter, the first method is described with reference to FIG. 11 and FIG. 12, and the second method is described with reference to FIG. 13 and FIG. 14.

Figure 11:
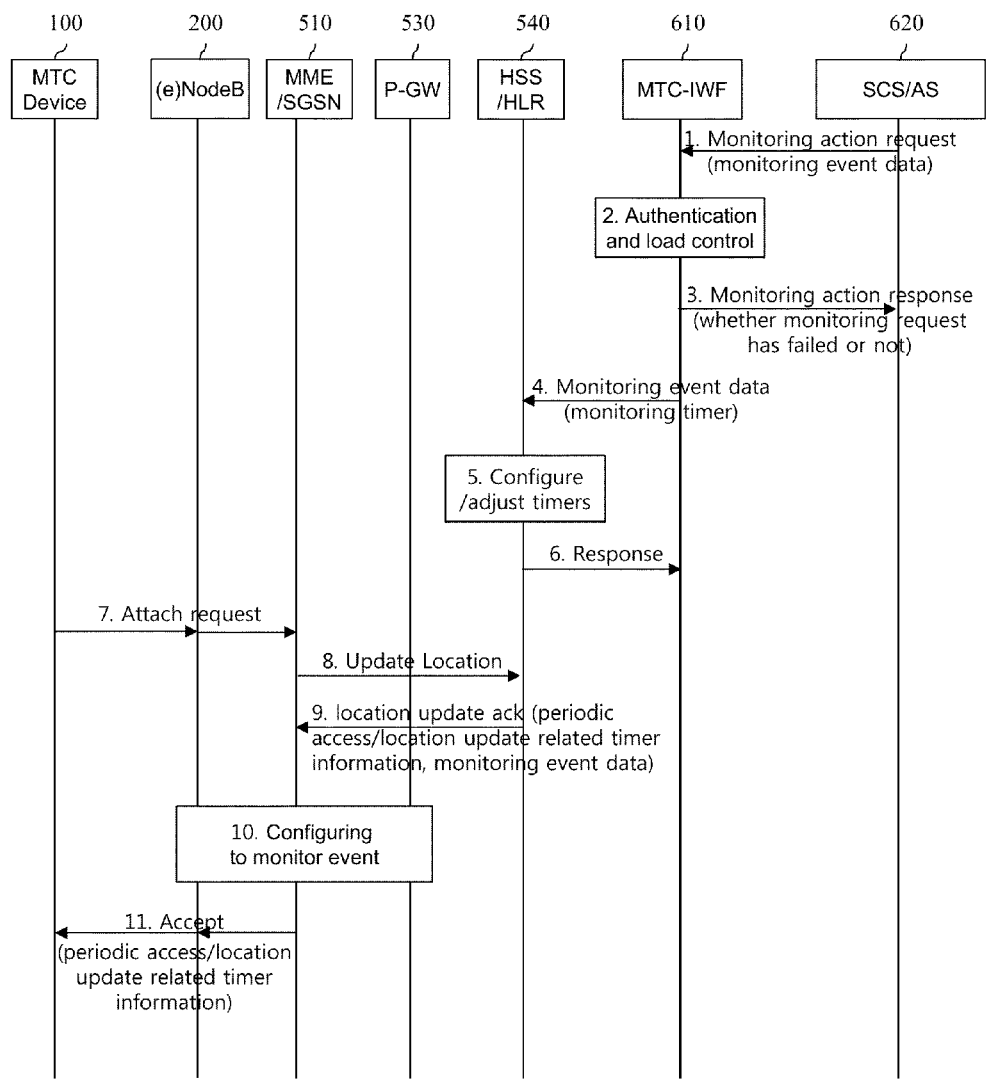
FIG. 11 is a flowchart showing a procedure of performing MTC monitoring according to a first method proposed in the present specification.

FIG. 11 is a flowchart showing a procedure of performing MTC monitoring according to the first method proposed in the present specification.

As can be seen from FIG. 11, according to the first method proposed in the present specification, an HSS/HLR 540 configures/adjusts any one of an MTC monitoring related timer and the periodic access (or location update) related timer (e.g., a T3312 timer, a T3312 extended timer, a T3412 timer, or a T3412 extended timer) (e.g., a subscribed periodic RAU/TAU timer value) on the basis of the other one. The MTC monitoring related timer is associated with a time value (i.e., D_max) capable of determining that a monitoring event is detected and/or a period (i.e., D_period) for detecting whether a specific monitoring event occurs.

Detailed descriptions are as followed. However, descriptions similar to those of FIG. 9 will not be repeated, and the aforementioned descriptions will be applied in this case.

1) To start monitoring, an SCS/AS 620 transmits a monitoring action request message to an MTC-IWF 610. In this case, the MTC monitoring related timer (e.g., D_max, D_period) may be transmitted together. The MTC monitoring related timer may be transmitted together with associated other monitoring event related information (e.g., a type of a monitoring event to be detected, an ID of SCS/AS for sending a report upon detection of the event, etc.). In addition, if there are a plurality of monitoring events to be detected, an MTC monitoring related timer may exist for each type, and one MTC monitoring related timer may exist. This is applied throughout the present invention.

2~3) Upon reception of the request, the MTC-IWF 610 authenticates whether an SCS/AS 620 has a right for the request, and confirms whether the request of the SCS/AS 620 is beyond a predetermined allocation criterion. If the confirmation result shows that the request of the SCS/AS 620 is acceptable, the MTC-IWF 610 transmits to the SCS/AS 620 a monitoring action response including a value indicating a success of the request.

4~6) Next, the MTC-IWF 610 transmits monitoring event data including the MTC monitoring related timer (e.g., D_max, D_period) to the HSS/HLR 540. The HSS/HLR 540 configures/adjusts any one of the MTC monitoring related timer (e.g., D_max, D_period) and the periodic access (or location update) related timer (e.g., a T3312 timer, a T3312 extended timer, a T3412 timer, or a T3412 extended timer) (e.g., a subscribed periodic RAU/TAU timer value) on the basis of the other one. The HSS/HLR 540 transmits a response for a message received in the step 4. If the MTC monitoring related timer (e.g., D_max, D_period) is configured/adjusted in the step 5, the HSS/HLR 540 may allow the response to include the configured/adjusted MTC monitoring related timer.

7~8) Meanwhile, the MTC device 100 transmits an attach request to the MME/SGSN 510. Then, the MME/SGSN 510 transmits a location update request message to the HSS/HLR 540.

9) The HSS/HLR 540 transmits to the MME/SGSN 510 the periodic access (or location update) related timer (e.g., a timer for periodic TAU/RAU) (e.g., one or more of a T3312 timer, a T3312 extended timer, a T3412 timer, and a T3412 extended timer) (e.g., a subscribed periodic RAU/TAU timer value) and monitoring event data by including them to a location update acknowledgement. The monitoring event data includes the aforementioned MTC monitoring related timer (e.g., D_max, D_period).

10) Since the received location update response message includes the monitoring event data, the MME/SGSN 510 is configured to monitor an event. Meanwhile, the configured event may be monitored by the MME/SGSN 510, or according to a situation, may be monitored by the (e)NodeB 200 and/or the P-GW 530.

11) The MME/SGSN 510 transmits an accept message for the attach request to the MTC device 100 by including the periodic access (or location update) related timer (e.g., one or more of the T3312 timer, the T3312 extended timer, the T3412 timer, and the T3412 extended timer). As such, any one of the MTC monitoring related timer (e.g., D_max, D_period) and the periodic access (or location update) related timer (e.g., a T3312 timer, a T3312 extended timer, a T3412 timer, and a T3412 extended timer) is configured/adjusted on the basis of the other one, and thereafter each of them is delivered to the MME/SGSN 510. Therefore, the MME/SGSN 510 can correctly perform MTC monitoring. That is, a problem which occurs due to a difference between the aforementioned timers can be solved. More specifically, for example, if the periodic access (or location update) related timer (e.g., a T3312 timer, a T3312 extended timer, a T3412 timer, and a T3412 extended timer) is adjusted by considering the MTC monitoring related timer (e.g., D_max, D_period), it is possible to avoid a situation in which the MME/SGSN 510 wrongly determines that an event occurs when the event does not occur in practice. For this, for example, a value of the periodic access (or location update) related timer (e.g., a T3312 timer, a T3312 extended timer, a T3412 timer, and a T3412 extended timer) may be configured to a value equal to a smaller value between the MTC monitoring related timers, e.g., D_max and D_period, or may be configured to a value smaller than a smaller value between D_max information and D_period information. Meanwhile, when a value of the periodic access (or location update) related timer is configured or adjusted/updated, not only the MTC monitoring relater timer (e.g., D_max, D_period) but also other information (for example, information on a monitoring event, subscriber information, an operator policy, a network status, a feature of an MTC device, whether to perform roaming of the MTC device, etc.) may also be considered.

Meanwhile, although it is described that the periodic access (or location update) related timer, e.g., a periodic TAU/RAU related timer, can be configured/adjusted by the HSS/HLR 540 on the basis of the MTC monitoring related timer (e.g., D_max, D_period), a new timer configured on the basis of the MTC monitoring related timer (e.g., D_max, D_period) may be alternatively provided. When a value of the newly defined timer is delivered to a network node which is an entity for monitoring (e.g., the MME/SGSN 510), the network node (e.g., the MME/SGSN 510) may apply/adjust the periodic access (or location update) related timer on the basis of the newly defined timer.

In addition, instead of always considering the MTC monitoring related timers, e.g., D_max and D_period, as described above, the periodic access (or location update) related timer may be configured/updated by considering only D_max as a modified example or the periodic access (or location update) related timer may be configured/updated by considering only D_period.

In addition, whenever the periodic access (or location update) related timer or information having an effect on the value is updated, the HSS/HLR 540 may provide the updated result to the MMS/SGSN 510 which is an entity for the monitoring. In addition, whenever the MTC monitoring related timer (e.g., D_max, D_period) is updated, the HSS/HLR 540 may provide the updated result to the MMS/SGSN 510 which is an entity for the monitoring.

Figure 12:
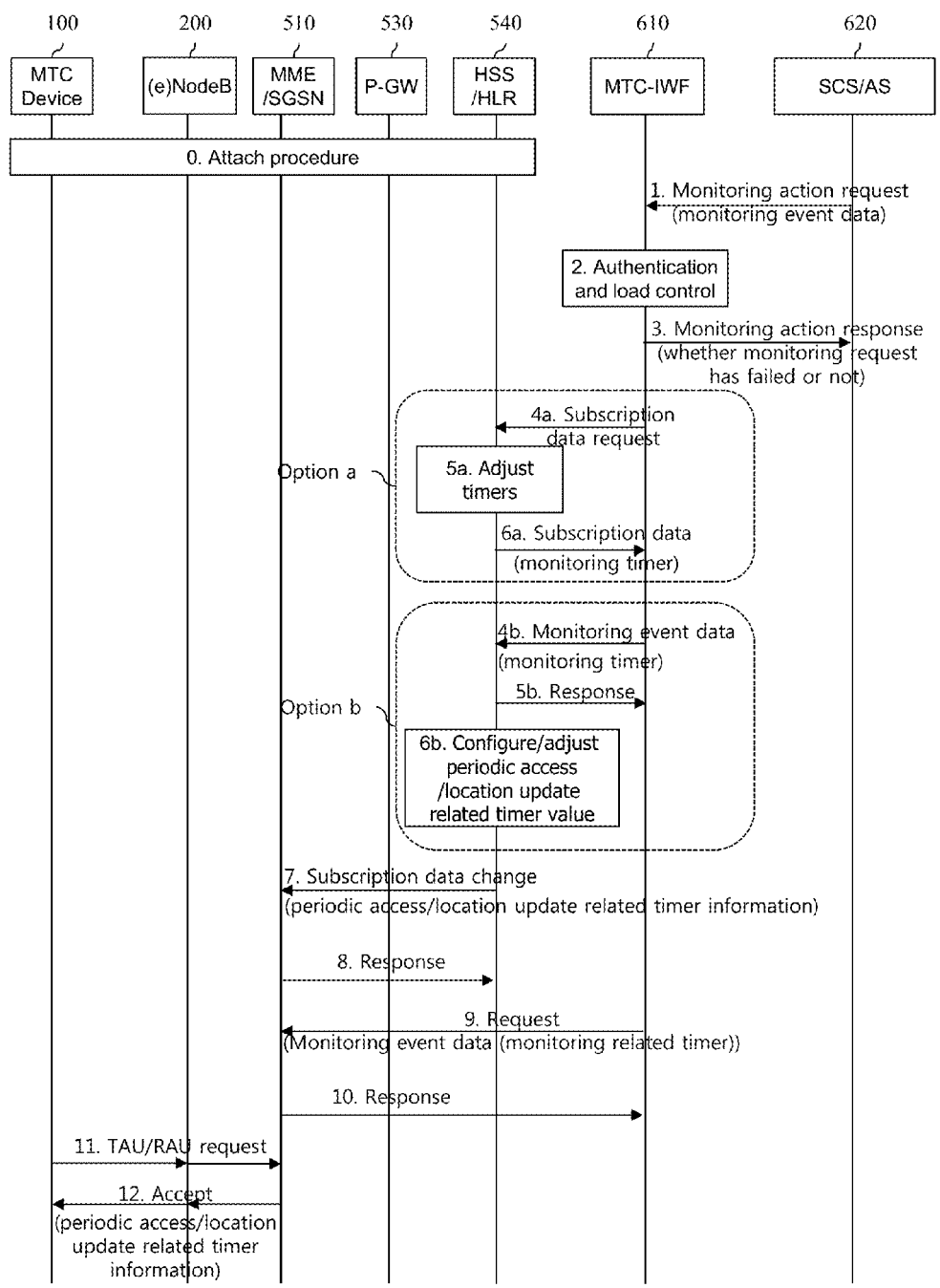
FIG. 12 is a flowchart showing another procedure of performing MTC monitoring according to a first method proposed in the present specification.

FIG. 12 is a flowchart showing another procedure of performing MTC monitoring according to the first method proposed in the present specification.

As can be seen from FIG. 12, according to the first method proposed in the present specification, an HSS/HLR 540 configures any one of an MTC monitoring related timer and the periodic access (or location update) related timer (e.g., a T3312 timer, a T3312 extended timer, a T3412 timer, or a T3412 extended timer) (e.g., a subscribed periodic RAU/TAU timer value) on the basis of the other one. The MTC monitoring related timer is associated with a time value (i.e., D_max) capable of determining that a monitoring event is detected and/or a period (i.e., D_period) for detecting whether a specific monitoring event occurs. In this case, several embodiments such as an option a and an option b may exist according to where the MTC monitoring related timer is stored. According to the option a, the MTC monitoring related timer, e.g., a time value (i.e., D_max) capable of determining that a monitoring event is detected, and a period (i.e., D_period) for detecting whether a specific monitoring event occurs may be stored in the HSS/HLR 540. Alternatively, according to the option b, it may be provided by the SCS/AS 620.

Detailed descriptions are as followed. However, descriptions similar to those of FIG. 9 will not be repeated, and the aforementioned descriptions will be applied in this case.

0) The MTC device 100 performs an attach procedure to a network. Details of the attach procedure may be found in the standard documents 3GPP TS 23.401 and TS 23.060.

1) To start monitoring, the SCS/AS 620 transmits a monitoring action request to an MTC-IWF 610. In this case, according to the option b, an MTC monitoring related timer (e.g., D_max, D_period) may be transmitted together.

2~3) Upon reception of the request, the MTC-IWF 610 authenticates whether the SCS/AS 620 has a right for the request, and confirms whether the request of the SCS/AS 620 is beyond a predetermined allocation criterion. If the confirmation result shows that the request of the SCS/AS 620 is acceptable, the MTC-IWF 610 transmits to the SCS/AS 620 a monitoring action response including a value indicating a success of the request.

4~6) Next, according to the option a, since the MTC monitoring related timer (e.g., D_max, D_period) is stored in the HSS/HLR 540, the MTC-IWF 610 transmits a subscriber information request message to the HSS/HLR 540 to acquire it. The subscriber information request message is transmitted to acquire a variety of information for an MTC device, such as routing information (i.e., serving node information) for the MTC device, or the like, in addition to the MTC monitoring related timer information. A procedure of requesting and acquiring the subscriber information may also be applied to the option b. In this case, the HSS/HLR 540 may configure/adjust any one of the MTC monitoring related timer (e.g., D_max, D_period) and the periodic access (or location update) related timer (e.g., the T3312 timer, the T3312 extended timer, the T3412 timer, or the T3412 extended timer) (e.g., a subscribed periodic RAU/TAU timer value) in advance on the basis of the other one. Then, the HSS/HLR 540 transmits the MTC monitoring related timer (e.g., D_max, D_period) among the configured/adjusted timers to the MTC-IWF 610.

However, according to the option b, the monitoring event data including the MTC monitoring related timer (e.g., D_max, D_period) is delivered to the HSS/HLR 540 via the MTC-IWF 610. After (or before) transmitting a response for the delivery, the HSS/HLR 540 configures a value of the periodic access (or location update) related timer (e.g., the T3312 timer, the T3312 extended timer, the T3412 timer, or the T3412 extended timer) (e.g., a subscribed periodic RAU/TAU timer) on the basis of the received MTC monitoring related timer (e.g., D_max, D_period).

7~8) In the step 5a or 6b, if the HSS/HLR 540 adjusts/updates the periodic access (or location update) related timer (e.g., a T3312 timer, a T3312 extended timer, a T3412 timer, or a T3412 extended timer) (i.e., a subscribed periodic RAU/TAU timer value), the adjusted/updated timer information is transmitted to the MME/SGSN 510, i.e., the serving node of the MTC device 100. The MME/SGSN 510 transmits a response for a received message to the HSS/HLR 540.

9~10) Meanwhile, the MTC-IWF 610 determines the network node for performing the monitoring, on the basis of information received from the SCS/AS 620 and the HSS/HLR 540. If the network node for performing the monitoring is determined as the MME/SGSN 510, the MTC-IWF 610 transmits to the MME/SGSN 510 a request including monitoring event data. The monitoring event data includes the aforementioned MTC monitoring related timer (e.g., D_max, D_period). The MME/SGSN 510 transmits a response to the MTC_IWF 610. The steps 9 and 10 may be performed simultaneously with the steps 7 and 8.

11~12) Meanwhile, the MTC device 100 transmits a TAU/RAU request to the MME/SGSN 510. Then, the MME/SGSN 510 transmits to the MTC device 100 an accept message for the TAU/RAU request by including the periodic access (or location update) related timer (e.g., one or more of a T3312 timer, a T3312 extended timer, a T3412 timer, or a T3412 extended timer).

The MME/SGSN 510 is configured to monitor an MTC event after the step 9. The start of the monitoring event detection may be performed after the step 11 or 12 in practice. In addition, instead of transmitting a request including monitoring event data by the MTC-IWF 610 to the MME/SGSN 510 as shown in the step 9, the HSS/HLR 540 may transmit the request including the monitoring event data to the MME/SGSN 510. This may be performed in combination with the step 7.

As shown in FIG. 12, any one of the MTC monitoring related timer (e.g., D_max, D_period) and the periodic access (or location update) related timer (e.g., a T3312 timer, a T3312 extended timer, a T3412 timer, and a T3412 extended timer) is configured/adjusted on the basis of the other one, and thereafter each of them is delivered to the MME/SGSN 510. Therefore, the MME/SGSN 510 can correctly perform MTC monitoring. That is, a problem which occurs due to a difference between the aforementioned timers can be solved. More specifically, for example, if the periodic access (or location update) related timer (e.g., a T3312 timer, a T3312 extended timer, a T3412 timer, and a T3412 extended timer) is adjusted by considering the MTC monitoring related timer (e.g., D_max, D_period), it is possible to avoid a situation in which the MME/SGSN 510 wrongly determines that an event occurs when the event does not occur in practice. For this, for example, a value of the periodic access (or location update) related timer (e.g., a T3312 timer, a T3312 extended timer, a T3412 timer, and a T3412 extended timer) may be configured to a value equal to a smaller value between the MTC monitoring related timers, e.g., D_max and D_period, or may be configured to a value smaller than a smaller value between D_max information and D_period information. Meanwhile, when a value of the periodic access (or location update) related timer is configured or adjusted/updated, not only the MTC monitoring relater timer (e.g., D_max, D_period) but also other information (for example, information on a monitoring event, subscriber information, an operator policy, a network status, a feature of an MTC device, whether to perform roaming of the MTC device, etc.) may also be considered.

On the other hand, according to the option a, the MTC monitoring related timer (e.g., D_max, D_period) is configured/stored in the HSS/HLR 540, and the timer may be dynamically configured/updated. The dynamic configuration/update may be performed when the HSS/HLR 540 provides information of monitoring event data including the MTC monitoring related timer (e.g., D_max, D_period). In this method, the SCS/AS 620 may provide the information to the MTC-IWF 610 through the Tsp interface shown in FIG. 7, and the MTC-IWF 610 may provide the information to the HSS/HLR 540 through the S6m interface.

Meanwhile, although it is described that the periodic access (or location update) related timer, e.g., a periodic TAU/RAU related timer, can be configured/adjusted by the HSS/HLR 540 on the basis of the MTC monitoring related timer (e.g., D_max, D_period), a new timer configured on the basis of the MTC monitoring related timer (e.g., D_max, D_period) may be alternatively provided. When a value of the newly defined timer is delivered to a network node which is an entity for monitoring (e.g., the MME/SGSN 510), the network node (e.g., the MME/SGSN 510) may apply/adjust the periodic access (or location update) related timer on the basis of the newly defined timer.

In addition, instead of always considering the MTC monitoring related timers, e.g., D_max and D_period, as described above, the periodic access (or location update) related timer may be configured/updated by considering only D_max as a modified example or the periodic access (or location update) related timer may be configured/updated by considering only D_period.

In addition, whenever the periodic access (or location update) related timer or information having an effect on the value is updated, the HSS/HLR 540 may provide the updated result to the MMS/SGSN 510 which is an entity for the monitoring.

In addition, in FIG. 11 and FIG. 12, if the HSS/HLR 540 is not available to configure/update the periodic access (or location update) related timer by considering the MTC monitoring related timer (e.g., D_max, D_period) (e.g., when D_max information and D_period information are relatively small values and thus it is impossible to configure/update information having an effect to a value of the periodic access (or location update) related timer by using the same or smaller value), this may be reported to one or more nodes (e.g., the MTC_IWF 610 and the SCS/AS 620) related to the monitoring.

Figure 13:
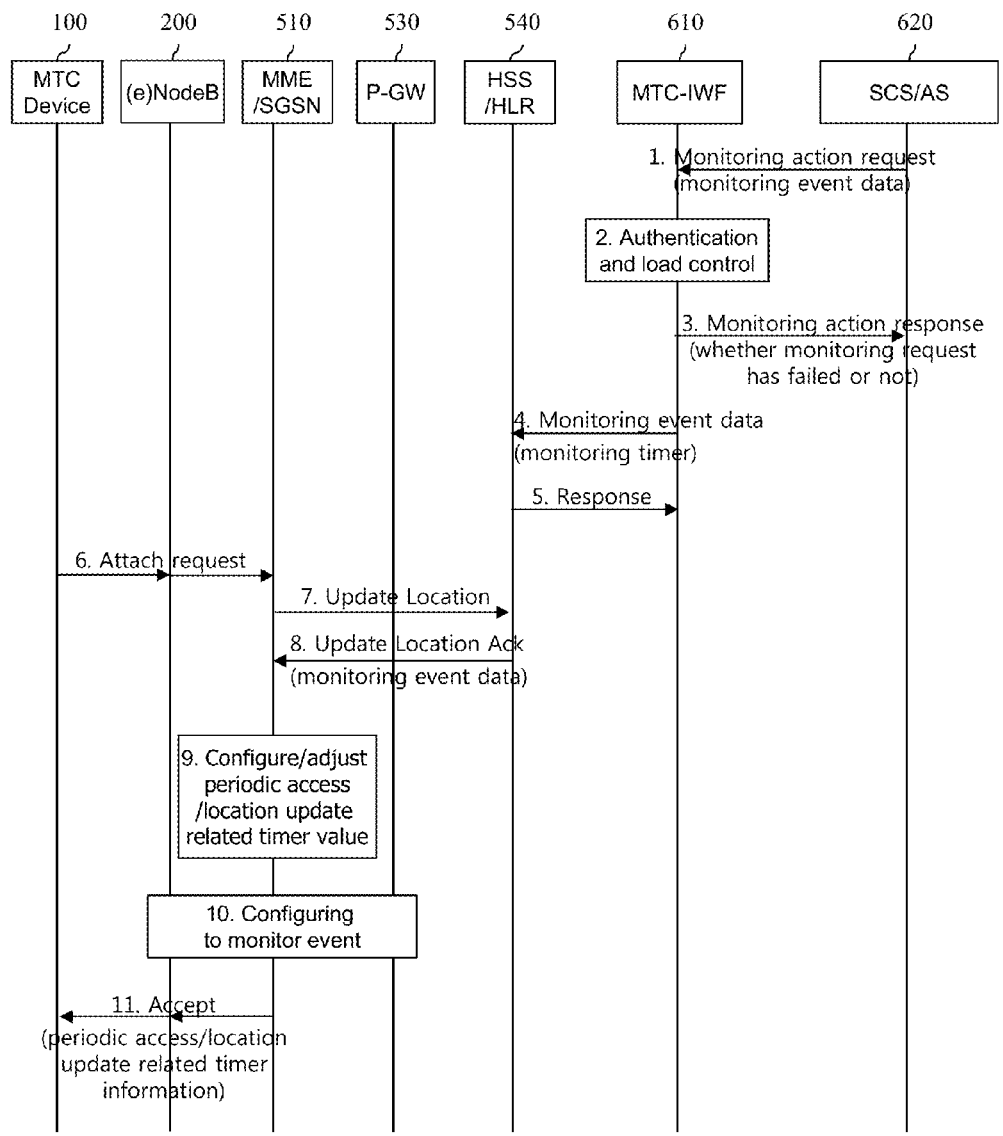
FIG. 13 is a flowchart showing a procedure of performing MTC monitoring according to a second method proposed in the present specification.

FIG. 13 is a flowchart showing a procedure of performing MTC monitoring according to the second method proposed in the present specification.

As can be seen from FIG. 13, according to the second method proposed in the present specification, a network node for performing MTC monitoring, e.g., the MME/SGSN 510, may configure the periodic access (location update) related timer (e.g., the T3312 timer, the T3312 extended timer, the T3412 timer, or the T3412 extended timer) on the basis of the MTC monitoring related timer. In this case, in addition to the MTC monitoring related timer, the MME/SGSN 510 may consider one or more pieces of additional information as shown in Table 9 above. However, the present invention is not limited thereto, and thus a variety of information related to a monitoring operation in terms of an MTC service may be considered, and also a variety of information stored in or provided by the existing network or the MTC device may be considered.

TABLE 9

Subscriber information (e.g., timer related information in association with mobility management acquired from HSS/HLR (e.g., subscribed periodic RAU/TAU timer information, etc.))
MTC device capability information and/or priority information (e.g., whether it is an MTC device configured with a low priority, an MTC device configured with a dual priority, or an MTC device applied with a timer for performing RAU/TAU with a longer period, etc.)
HPLMN and/or VPLMN operator policy
MTC monitoring related information
Information acquired from another node (e.g., SCS/AS, MTC-IWF, S-GW, P-GW, GGSN, etc.)
Information acquired from another serving node (e.g., in case of MME, information acquired from SGSN, and in case of SGSN, information acquired from MME)
Network status information (e.g., RAN congestion status, core network congestion status, etc.)
Values of timers associated with mobility management related operation
Values of timers associated with session management related operation This will be described below in detail by referring to FIG. 13.

1~3) These steps are the same as those described in FIG. 11 and FIG. 12, and thus redundant descriptions will be omitted.

4~5) Monitoring event data including the MTC monitoring related timer (e.g., D_max, D_period) is delivered from the SCS/AS 620 to the HSS/HLR 540 via the MTC-IWF 610. The HSS/HLR 540 transmits a response for the delivery.

6~7) Meanwhile, the MTC device 100 transmits an attach request to the MME/SGSN 510. Then, the MME/SGSN 510 transmits a location update request message to the HSS/HLR 540.

8) The HSS/HLR 540 transmits the monitoring event data to the MME/SGSN 510 by including the data to a location update acknowledgement. The monitoring event data includes the MTC monitoring related timer (e.g., D_max, D_period).

9) Then, the MME/SGSN 510 adjusts/configures the received periodic access (location update) related timer (e.g., a timer for periodic TAU/RAU) (e.g., the T3312 timer, the T3312 extended timer, the T3412 timer, or the T3412 extended timer)(e.g., a subscribed periodic RAU/TAU timer value) by considering the MTC monitoring related timer (e.g., D_max, D_period). In this case, as described above, in addition to the MTC monitoring related timer, one or more pieces of additional information may be considered as shown in Table 9 above.

10) Since the received location update response message includes the monitoring event data, the MME/SGSN 510 is configured to monitor an event. Meanwhile, the configured event may be monitored by the MME/SGSN 510, or according to a situation, may be monitored by the (e)NodeB 200 and/or the P-GW 530.

11) The MME/SGSN 510 transmits an accept message for the attach request to the MTC device 100 by including the adjusted/configured periodic access (or location update) related timer (e.g., one or more of the T3312 timer, the T3312 extended timer, the T3412 timer, and the T3412 extended timer).

In addition, the MME/SGSN 510 may provide the HSS/HLR 540 with the configured/adjusted periodic access (or location update) related timer (e.g., a T3312 timer, a T3312 extended timer, a T3412 timer, or a T3412 extended timer) (e.g., a subscribed periodic RAU/TAU timer value). Upon receiving this, the HSS/HLR 540 may update/store a periodic access (or location update) related timer stored therein (e.g., the T3312 timer, the T3312 extended timer, the T3412 timer, or the T3412 extended timer) (e.g., the subscribed periodic RAU/TAU timer value). In doing so, the HSS/HLR 540 may provide the updated periodic access (or location update) related timer to another serving node (e.g., MME or SGSN) when transmitting subscriber information.

Meanwhile, after the MME/SGSN 510 configures/adjusts the periodic access (or location update) related timer (e.g., the T3312 timer, the T3312 extended timer, the T3412 timer, or the T3412 extended timer) (e.g., the subscribed periodic RAU/TAU timer value), there may be a change in the aforementioned one or more pieces of additional information. In this case, if the one or more pieces of additional information are acquired by using the HSS/HLR 540, the HSS/HLR may report the changed additional information to the MME/SGSN 510. Then, the MME/SGSN 510 may update the adjusted periodic access (or location update) related timer. As such, when the MME/SGSN 510 performs the update, this may also be reported to the HSS/HLR 540.

In addition, the MME/SGSN 510 may store in a UE context the configured/adjusted periodic access (or location update) related timer information, in particular, periodic access (or location update) related timer information which is included when transmitting an attach access message to the MTC device 100. Therefore, when the MTC device 100 changes a serving node (i.e., MME/SGSN), the existing serving node is allowed to provide and utilize the periodic access (or location update) related timer to a new serving node. This may be applied throughout the present invention.

Meanwhile, although the HSS/HLR 540 transmits monitoring event data to the MME/SGSN 510 which is a network node for performing monitoring as in the steps 9 and 8 in FIG. 11 and FIG. 13, unlike this, the MTC-IWF 610 may transmit the monitoring event data to the MME/SGSN 510. In this case, the MTC-IWF 610 which receives a monitoring action request from the SCS/AS 620 performs an interaction with the HSS/HLR 540 to acquire routing information (i.e., serving node information) for the MTC device 100, but the MTC device 100 has not performed an attach to a network yet. For this reason, serving node information does not exist. Therefore, when the MTC device 100 is reachable, the MTC-IWF 610 may request the HSS/HLR 540 to notify this. Accordingly, when the MTC device 100 performs an attach to the network, the MTC-IWF 610 may acquire serving node information of the MTC device 100 from the HSS/HLR 540, and may request the serving node to perform monitoring by transmitting monitoring event data. This may be applied throughout the present invention.

Figure 14:
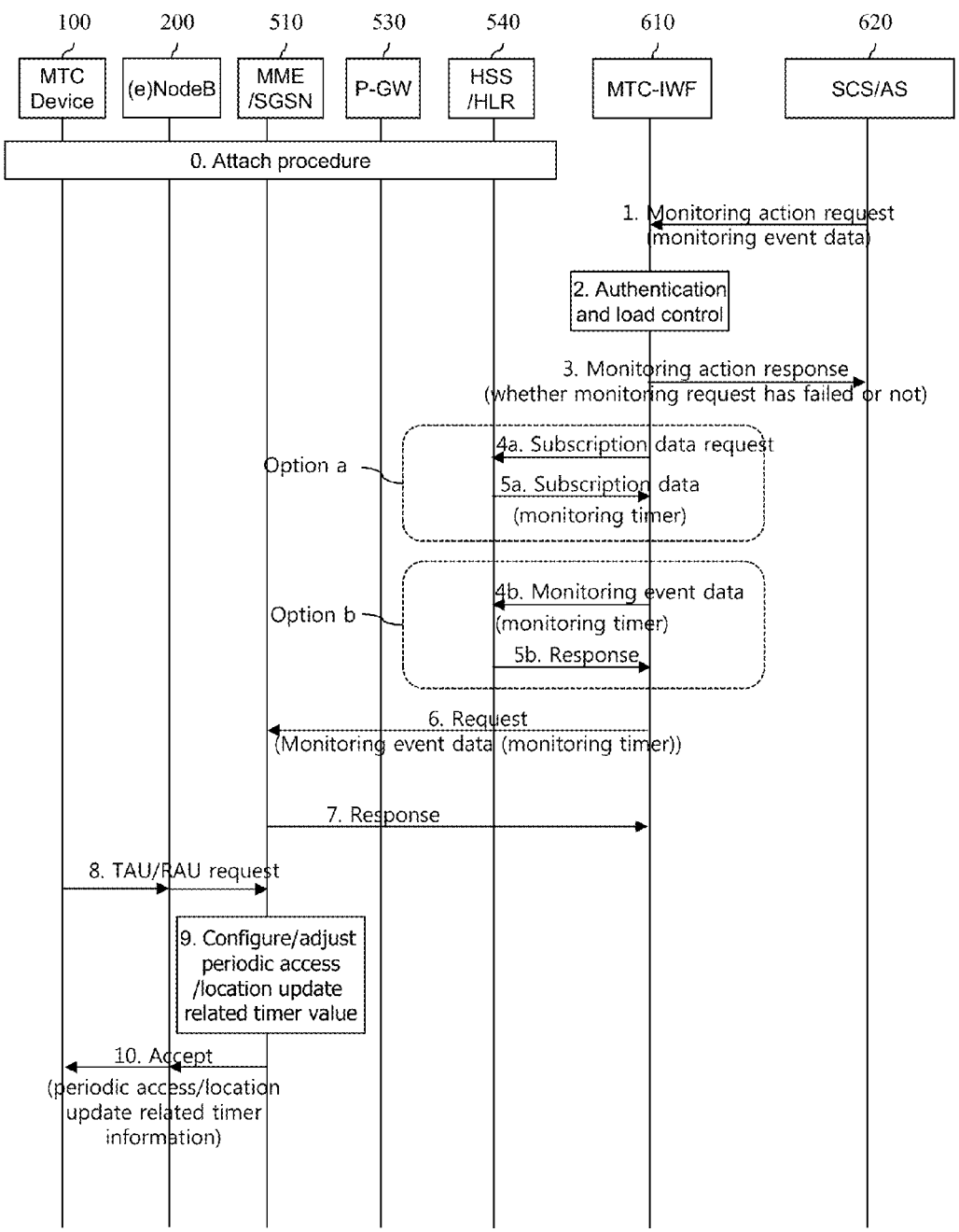
FIG. 14 is a flowchart showing another procedure of performing MTC monitoring according to a second method proposed in the present specification.

FIG. 14 is a flowchart showing another procedure of performing MTC monitoring according to the second method proposed in the present specification.

0) The MTC device 100 performs an attach procedure to a network. Details of the attach procedure may be found in the standard documents 3GPP TS 23.401 and TS 23.060.

1~3) These steps are the same as those described in FIG. 11 to FIG. 13, and thus redundant descriptions will be omitted.

4~5) As described above, several embodiments such as an option a and an option b may exist according to where the MTC monitoring related timer is stored.

According to the option a, since the MTC monitoring related timer (e.g., D_max, D_period) is stored in the HSS/HLR 540, the MTC-IWF 610 transmits a subscriber information request message to the HSS/HLR 540 to acquire it. Then, the HSS/HLR 540 transmits the MTC monitoring related timer (e.g., D_max, D_period) to the MTC-IWF 610. The subscriber information request message is transmitted to acquire a variety of information for an MTC device, such as routing information (i.e., serving node information) for the MTC device, or the like, in addition to the MTC monitoring related timer information. A procedure of requesting and acquiring the subscriber information may also be applied to the option b.

According to the option b, monitoring event data including the MTC monitoring related timer (e.g., D_max, D_period) is delivered from the SCS/AS 620 to the HSS/HLR 540 via the MTC-IWF 610. The HSS/HLR 540 transmits a response for the delivery.

6~7) Meanwhile, the MTC-IWF 610 determines the network node for performing the monitoring, on the basis of information received from the SCS/AS 620 and the HSS/HLR 540. If the network node for performing the monitoring is determined as the MME/SGSN 510, the MTC-IWF 610 transmits to the MME/SGSN 510 a request including monitoring event data. The monitoring event data includes the aforementioned MTC monitoring related timer (e.g., D_max, D_period). The MME/SGSN 510 transmits a response to the MTC-IWF 610.

8) Meanwhile, the MTC device 100 transmits a TAU/RAU request to the MME/SGSN 510.

9) Then, the MME/SGSN 510 adjusts/configures the received periodic access (location update) related timer (e.g., a timer for periodic TAU/RAU) (e.g., the T3312 timer, the T3312 extended timer, the T3412 timer, or the T3412 extended timer)(e.g., a subscribed periodic RAU/TAU timer value) by considering the MTC monitoring related timer (e.g., D_max, D_period). In this case, as described above, in addition to the MTC monitoring related timer, one or more pieces of additional information may be considered as shown in Table 9 above.

10) Subsequently, the MME/SGSN 510 transmits to the MTC device 100 an accept message for the TAU/RAU request by including the configured/adjusted periodic access (or location update) related timer (e.g., one or more of a T3312 timer, a T3312 extended timer, a T3412 timer, or a T3412 extended timer).

The MME/SGSN 510 is configured to monitor an MTC event after the step 6. The start of the monitoring event detection may be performed after the step 8, 9, or 10 in practice. In addition, instead of transmitting a request including monitoring event data by the MTC-IWF 610 to the MME/SGSN 510 as shown in the step 6, the HSS/HLR 540 may transmit the request including the monitoring event data to the MME/SGSN 510.

In addition, the MME/SGSN 510 may provide the HSS/HLR 540 with the configured/adjusted periodic access (or location update) related timer (e.g., a T3312 timer, a T3312 extended timer, a T3412 timer, or a T3412 extended timer) (e.g., a subscribed periodic RAU/TAU timer value). Upon receiving this, the HSS/HLR 540 may update/store a periodic access (or location update) related timer stored therein (e.g., the T3312 timer, the T3312 extended timer, the T3412 timer, or the T3412 extended timer) (e.g., the subscribed periodic RAU/TAU timer value). In doing so, the HSS/HLR

540 may provide the updated periodic access (or location update) related timer to another serving node (e.g., MME or SGSN) when transmitting subscriber information.

Meanwhile, after the MME/SGSN 510 configures/adjusts the periodic access (or location update) related timer (e.g., the T3312 timer, the T3312 extended timer, the T3412 timer, or the T3412 extended timer) (e.g., the subscribed periodic RAU/TAU timer value), there may be a change in the aforementioned one or more pieces of additional information. In this case, if the one or more pieces of additional information are acquired by using the HSS/HLR 540, the HSS/HLR may report the changed additional information to the MME/SGSN 510. Then, the MME/SGSN 510 may update the adjusted periodic access (or location update) related timer. As such, when the MME/SGSN 510 performs the update, this may also be reported to the HSS/HLR 540.

In addition, the MME/SGSN 510 may store in a UE context the configured/adjusted periodic access (or location update) related timer information, in particular, periodic access (or location update) related timer information which is included when transmitting a TAU accept or RAU accept message to the MTC device 100. Therefore, when the MTC device 100 changes a serving node (i.e., MME/SGSN), the existing serving node is allowed to provide and utilize the periodic access (or location update) related timer to a new serving node. This may be applied throughout the present invention.

Meanwhile, in FIG. 13 and FIG. 14, if the HSS/HLR 540 is not available to configure/update the periodic access (or location update) related timer by considering the MTC monitoring related timer (e.g., D_max, D_period) (e.g., when D_max information and D_period information are relatively small values and thus it is impossible to configure/update information having an effect to a value of the periodic access (or location update) related timer (e.g., a T3312 timer, a T3312 extended timer, a T3412 timer, or a T3412 extended timer) by using the same or smaller value), this may be reported to one or more nodes (e.g., HSS/HLR, MTC-IWF, SCS/AS) related to the monitoring.

Figure 15:
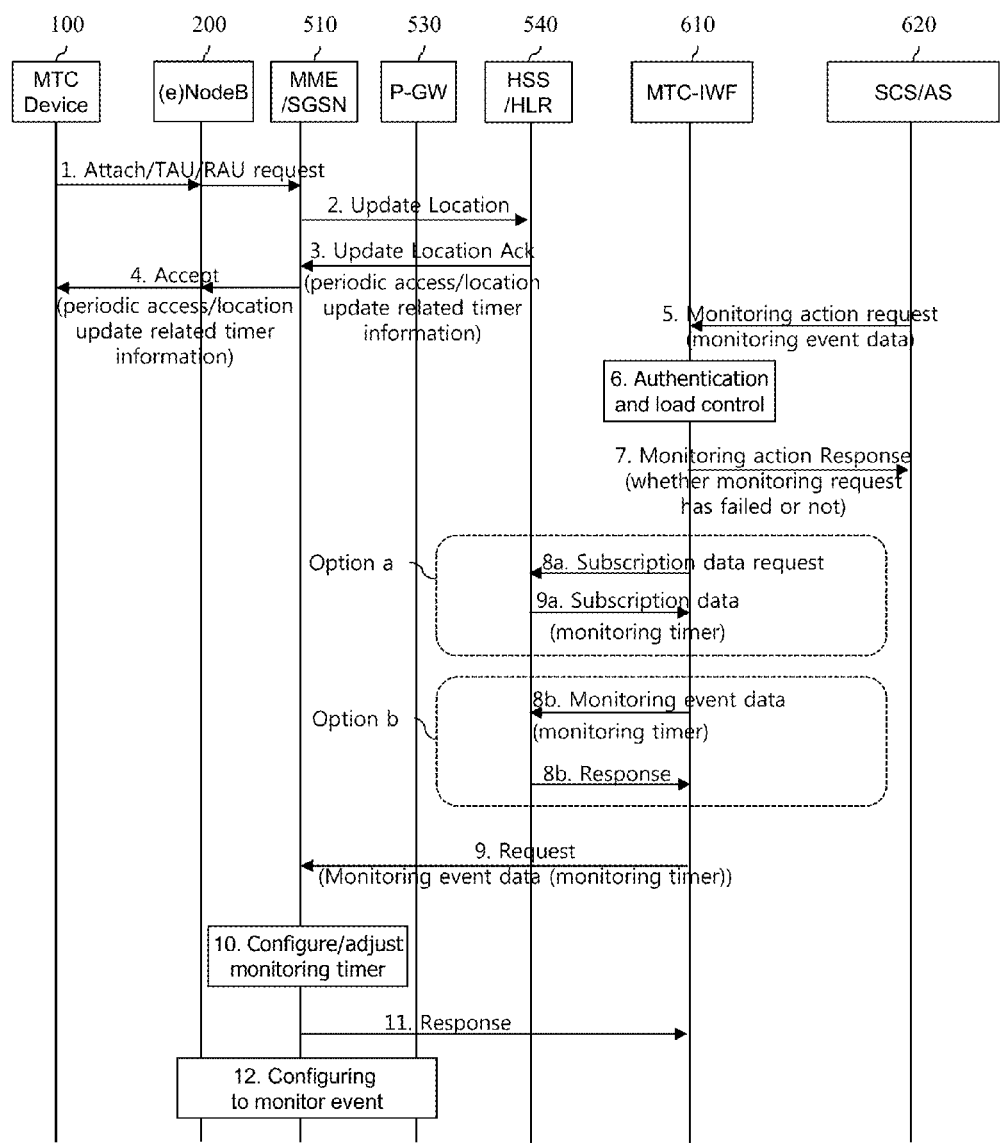
FIG. 15 shows a modified example for the methods shown in FIG. 13 and FIG. 14.

FIG. 15 shows a modified example for the methods shown in FIG. 13 and FIG. 14.

Referring to FIG. 15, a network node for performing MTC monitoring, e.g., the MME/SGSN 510, may configure/adjust an MTC monitoring related timer (e.g., D_max, D_period) on the basis of a periodic access (or location update) related timer. Since a signal flow shown in FIG. 15 can be easily known from FIG. 13 and FIG. 14, detailed descriptions thereof will be omitted. As described above, since the MMS/SGSN 510 can adjust the MTC monitoring related timer provided by the MTC-IWF 610, if the MTC monitoring related timer value is changed, the MME/SGSN 510 may report the changed MTC monitoring related timer value to the MTC-IWF 610.

Figure 16:
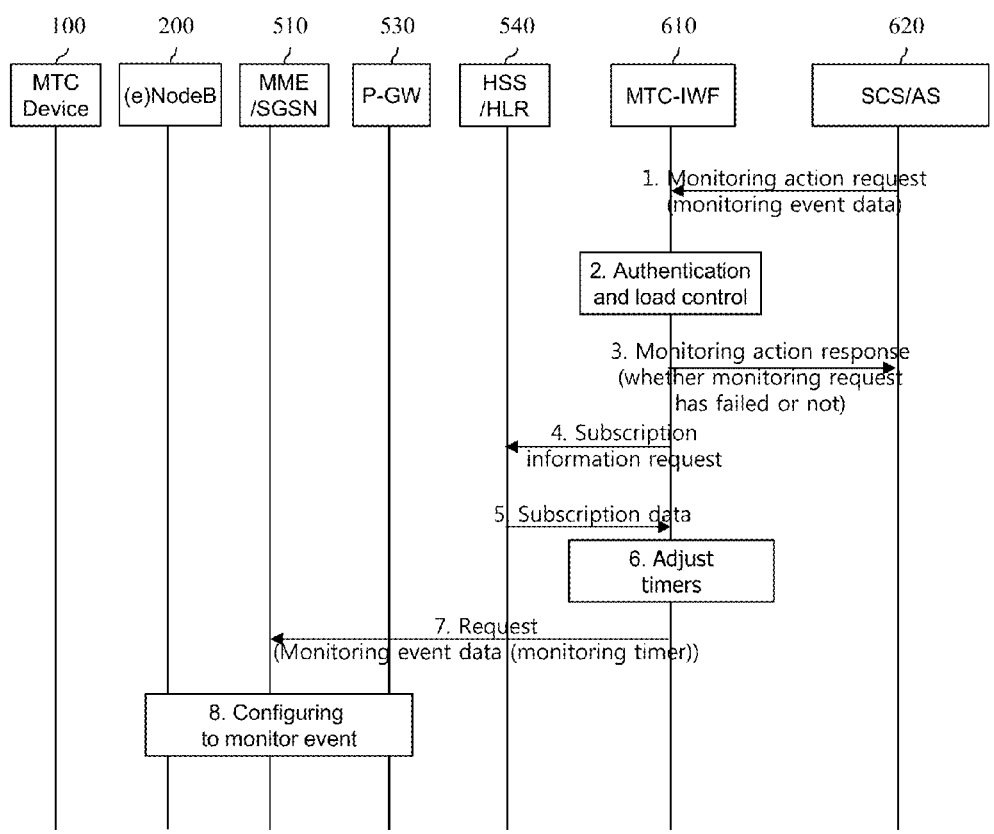
FIG. 16 shows a modified example for the methods shown in FIG. 11 to FIG. 15.

FIG. 16 shows a modified example for the methods shown in FIG. 11 to FIG. 15.

As can be seen from FIG. 16, a network node related to MTC monitoring, e.g., the MTC-IWF 610, may configure any one of an MTC monitoring related timer and the periodic access (or location update) related timer (e.g., the T3312 timer, the T3312 extended timer, the T3412 timer, or the T3412 extended timer) (e.g., a subscribed periodic RAU/TAU timer value) on the basis of the other one. In this case, although it is shown in FIG. 16 that the MTC-IWF 610 adjusts timers, the timers may be configured/adjusted by the network node related to the MTC monitoring, e.g., a node such as an MTC monitoring server, a PCRF, an S-GW, the P-GW 530, a GGSN, the SCS/AS 620, or an application server (AS).

More specifically, this is described as follows.

1~3) These steps are the same as those described in FIG. 11, and thus redundant descriptions will be omitted.

4~5) The MTC-IWF 610 requests the HSS/HLR 540 to transmit subscriber information, and receives the subscriber information. Information on the periodic access (or location update) related timer may be included in the received subscriber information. In addition, information on the monitoring related timer may be included in the received subscriber information.

6) On the basis of any one of the periodic access (or location update) related timer acquired from the HSS/HLR 540 or the MTC monitoring related timer (D_max, D_period) acquired from the HSS/HLR 540, the MTC-IWF 610 may configure/adjust the other one. In this case, one or more pieces of additional information as shown in Table 9 above may be considered.

Although it is described up to now that the MTC-IWF 610 adjusts timers by referring to FIG. 16 for example, the timers may be configured/adjusted by the network node related to the MTC monitoring, e.g., a node such as an MTC monitoring server, a PCRF, an S-GW, the P-GW 530, a GGSN, the SCS/AS 620, or an application server (AS).

Embodiments described in FIG. 11 to FIG. 16 above may be used by being configured in a mutually combined manner.

Although the description of FIG. 9 to FIG. 16 focuses on a Packet Switched (PS) network, the present invention is also applicable by extension to a Circuit Switched (CS) network. In addition, although the above description focuses on time value information (D_max) capable of determining that a specific monitoring event is detected and period information (D_period) for detecting whether the specific monitoring event occurs, the present invention is also applicable by extension to all time/period information which may have an effect on a periodic location registration operation of a UE. In addition, the present invention is also applicable not only to a periodic location registration related timer value of the UE but also other existing location registration related timer values and a timer value related to an MTC service.

In addition, the present invention is also applicable by extension not only to a Mobility Management (MM) but also to a Session Management (SM). That is, although the aforementioned description focuses on an MM related timer in association with an MTC monitoring event detectable by an MM operation, the present invention is also applicable to an SM related timer in association with an MTC monitoring event detectable by an SM operation.

The content described up to now can be implemented in hardware. This will be described with reference to FIG. 17.

Figure 17:
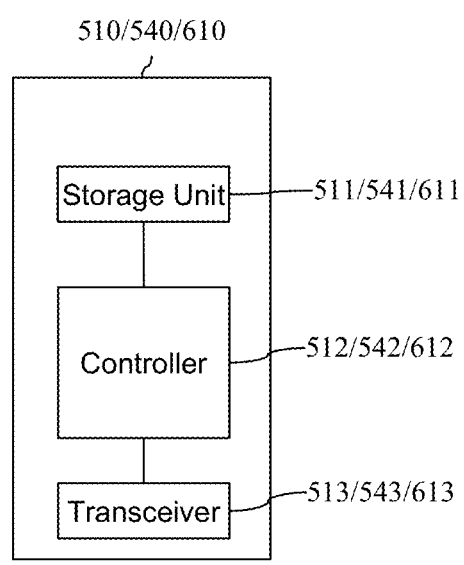
FIG. 17 is a block diagram showing a structure of a network node according to an embodiment of the present invention.

FIG. 17 is a block diagram showing a structure of a network node according to an embodiment of the present invention.

As shown in FIG. 17, the network node, for example, the MME/SGSN 510, the HSS/HLR 540, or the MTC-IWF 610, respectively includes storage elements 511, 541, and 611, controllers 512, 542, and 612, and transceivers 513, 543, and 613.

The storage elements 511, 541, and 611 store the method of FIG. 9 to FIG. 16.

The controllers 512, 542, and 612 control the storage elements 511, 541, and 611 and the transceivers 513, 543, and 613. More specifically, the controllers 512, 542, and 612 respectively execute the aforementioned methods stored in the storage elements 511, 541, and 611. Further, the controllers 512, 542, and 612 transmit the aforementioned signals via the transceivers 513, 543, and 613.

Although exemplary embodiments of the present invention have been described above, the scope of the present invention is not limited to the specific embodiments and the present invention may be modified, changed, or improved in various ways within the scope of the present invention and the category of the claims.

What is claimed is:

1. A method for adjusting a timer value for a device, the method comprising:
   receiving, by a home subscribing server (HSS) from an application server (AS), information on a maximum time period;
   setting, by the HSS, a timer value for a routing area update (RAU) or a tracking area update (TAU) to a smaller value than the maximum time period,
   wherein the maximum time period is related to a loss of a connectivity indicating the device is no longer possible to be signaled; and
   delivering, by the HSS, information regarding the timer value set for the RAU or the TAU to a Mobility Management Entity (MME)/Serving General Packet Radio Service (GPRS) Supporting Node (SGSN).

2. The method of claim 1, wherein the timer value for the RAU or the TAU includes one or more of:
   a T3312 value for the RAU;
   a T3312 extended value for the RAU;
   a T3412 value for the TAU; and
   a T3412 extended value for the TAU.

3. The method of claim 1, wherein the maximum time period is for transmitting an event to the AS.

4. The method of claim 1, wherein the setting of the timer value for the RAU or the TAU includes considering one or more of:
   subscriber information;
   capability information or priority information of a Machine Type Communication (MTC) device;
   operator policy information;
   MTC monitoring related information;
   information acquired from another node;
   network status information;
   information associated with a mobility management related operation; and
   information association with a session management related operation.

5. The method of claim 1, wherein the AS is a Machine Type Communication-InterWorking Function (MTC-IFW) or a service capability server.

6. A home subscription server (HSS) for adjusting a timer value for a device, the HSS comprising:
   a transceiver configured to receive, from an application server (AS), information on a maximum time period; and
   a processor configured to set a timer value for a routing area update (RAU) or a tracking area update (TAU) to a smaller value than the maximum time period,
   wherein the maximum time period is related to a loss of a connectivity indicating the device is no longer possible to be signaled, and
   wherein the transceiver delivers information regarding the timer value set for the RAU or the TAU to a Mobility Management Entity (MME)/Serving General Packet Radio Service (GPRS) Supporting Node (SGSN).

7. The HSS of claim 6, wherein the timer value for the RAU or the TAU includes one or more of:
   a T3312 value for the RAU;
   a T3312 extended value for the RAU;
   a T3412 value for the TAU; and
   a T3412 extended value for the TAU.

8. The HSS of claim 6, wherein the maximum time period is for transmitting an event to the AS.

9. The HSS of claim 6, wherein the processor sets the timer value for the RAU or the TAU by considering one or more of:
   subscriber information;
   capability information or priority information of a Machine Type Communication (MTC) device;
   operator policy information;
   MTC monitoring related information;
   information acquired from another node;
   network status information;
   information associated with a mobility management related operation; and
   information association with a session management related operation.

10. The HSS of claim 6, wherein the AS is a Machine Type Communication-InterWorking Function (MTC-IFW) or a service capability server.

11. The method of claim 1, wherein the HSS stores a Machine Type Communication (MTC) server identifier (ID).

12. The method of claim 1, wherein the device is a Machine Type Communication (MTC) device.

13. The HSS of claim 6, wherein the HSS stores a Machine Type Communication (MTC) server identifier (ID) for a reporting destination of a monitoring event.

14. The HSS of claim 6, wherein the device is a Machine Type Communication (MTC) device.

15. The method of claim 1, wherein after the maximum time period lapses, the loss of the connectivity is identified.

16. The HSS of claim 6, wherein after the maximum time period lapses, the loss of the connectivity is identified.

* * * * *